US010822487B2

(12) United States Patent
Sanders et al.

(10) Patent No.: US 10,822,487 B2
(45) Date of Patent: Nov. 3, 2020

(54) POLYMERIC COMPOSITIONS

(71) Applicant: Verdesian Life Sciences, LLC, Cary, NC (US)

(72) Inventors: John Larry Sanders, Leawood, KS (US); Jacob Mazo, Wilmette, IL (US); Grigory Mazo, Wilmette, IL (US)

(73) Assignee: Verdesian Life Sciences LLC, Cary, NC (US)

( * ) Notice: Subject to any disclaimer, the term of this patent is extended or adjusted under 35 U.S.C. 154(b) by 116 days.

(21) Appl. No.: 15/312,895

(22) PCT Filed: May 20, 2015

(86) PCT No.: PCT/US2015/031823
§ 371 (c)(1),
(2) Date: Nov. 21, 2016

(87) PCT Pub. No.: WO2015/179552
PCT Pub. Date: Nov. 26, 2015

(65) Prior Publication Data
US 2017/0183492 A1 Jun. 29, 2017

Related U.S. Application Data

(60) Provisional application No. 62/002,021, filed on May 22, 2014.

(51) Int. Cl.
| | |
|---|---|
| *C08L 35/00* | (2006.01) |
| *C08L 1/28* | (2006.01) |
| *C05G 3/20* | (2020.01) |
| *C05G 3/80* | (2020.01) |
| *C05G 5/30* | (2020.01) |
| *A01C 1/06* | (2006.01) |
| *B01J 2/30* | (2006.01) |
| *C08F 222/02* | (2006.01) |

(52) U.S. Cl.
CPC .............. *C08L 35/00* (2013.01); *A01C 1/06* (2013.01); *B01J 2/30* (2013.01); *C05G 3/20* (2020.02); *C05G 3/80* (2020.02); *C05G 5/37* (2020.02); *C08F 222/02* (2013.01); *C08L 1/286* (2013.01)

(58) Field of Classification Search
CPC ...... C05G 3/0082; C05G 3/0064; C05G 3/08; C05G 3/04; C05G 3/0088; C05G 3/0029; C05C 9/00; C05C 9/005; C08J 3/05; C08J 2333/02; C08L 35/00; C08L 2201/54; C08L 1/286; C08F 230/06; C08F 222/10; C08F 222/02; C05D 9/02; C08K 3/38; Y02P 60/218; B01J 2/30; A01C 1/06
See application file for complete search history.

(56) References Cited

U.S. PATENT DOCUMENTS

| | | |
|---|---|---|
| 2,618,547 A | 1/1950 | Davenport et al. |
| 2,616,849 A | 11/1952 | Giammaria |
| 2,616,853 A | 11/1952 | Giammaria |
| 2,625,471 A | 1/1953 | Mowry et al. |
| 2,625,529 A | 1/1953 | Hedrick et al. |
| 2,976,138 A | 3/1961 | Hester |
| 3,052,648 A | 9/1962 | Bauer |
| 3,087,893 A | 4/1963 | Agius et al. |
| 3,130,033 A | 4/1964 | Stephens |
| 3,222,282 A | 12/1965 | Berkowitz et al. |
| 3,262,919 A | 7/1966 | Bolgiono |
| 3,308,067 A | 3/1967 | Diehl |
| 3,388,990 A * | 6/1968 | Maruta ................. B01J 2/30 252/382 |
| 3,497,334 A | 2/1970 | Gee et al. |
| 3,634,052 A | 1/1972 | Gee et al. |
| 3,639,242 A | 2/1972 | Le Suer |
| 3,685,998 A | 8/1972 | Miller |
| 3,720,765 A | 3/1973 | Miller |
| 3,796,559 A | 3/1974 | Windgassen |
| 3,873,487 A | 3/1975 | Minato et al. |
| 3,936,427 A | 2/1976 | Viout et al. |
| 3,953,191 A | 4/1976 | Barton |
| 3,996,134 A | 12/1976 | Osborn et al. |
| 3,997,319 A | 12/1976 | Ott |
| 4,007,029 A | 2/1977 | Kenton |
| 4,010,006 A | 3/1977 | Price |

(Continued)

FOREIGN PATENT DOCUMENTS

| | | |
|---|---|---|
| CN | 1044025 A | 7/1990 |
| CN | 1149239 A | 5/1997 |

(Continued)

OTHER PUBLICATIONS

Sigma-Aldrich, C4888 Sigma. "Carboxymethylcellulose sodium salt" <https://www.sigmaaldrich.com/catalog/product/sigma/c4888> Obtained: Nov. 20, 2018.*
Marketizer "The Various Uses of Carboxymethylcellulose (CMC)" <https://www.marketizer.com/articles/the-various-uses-of-carboxymethylcellulose-cmc-2683164.htnn> Feb. 20, 2012.*
Agrotain International LLC White Paper: Maleic-Itaconic Copolymer; available online at talk.newagtalk.com/forums/get-attachment.asp?attachmentid=42697; downloaded Feb. 1, 2017.
AVAIL MSDS dated Jan. 16, 2012.
Aziz, et al. *Efficiency of Slow Release Urea Fertilizer on Herb Yield and Essential Oil Production of Lemon Balm (Melissa officinalis L.) Plant.* American-Eurasian J. Agric. & Environ. Sci., [Online] 5(2):141-147, 2009.

(Continued)

*Primary Examiner* — Jennifer A Smith
(74) *Attorney, Agent, or Firm* — Katten Muchin Rosenman LLP

(57) ABSTRACT

Water soluble polymeric compositions are provided including at least one polyanionic polymer component (e.g., a copolymer containing maleic and itaconic repeat units), and at least one high molecular weight component selected from copolymers different than the polyanionic polymer and preferably having dicarboxylic repeat units, and a cellulose or cellulose derivative. The compositions are preferably substantially free of hydrocarbons and can be used to coat solid fertilizers in order to reduce fines.

12 Claims, No Drawings

(56) References Cited

U.S. PATENT DOCUMENTS

| | | | |
|---|---|---|---|
| 4,071,400 A | 1/1978 | Jankowiak |
| 4,076,663 A | 2/1978 | Masuda et al. |
| 4,082,533 A | 4/1978 | Wittenbrook et al. |
| 4,083,835 A | 4/1978 | Pohlemann et al. |
| 4,135,887 A | 1/1979 | Rossi |
| 4,161,539 A | 7/1979 | Stallcup |
| 4,165,743 A | 8/1979 | Denning |
| 4,173,669 A | 11/1979 | Ashida et al. |
| 4,211,765 A | 7/1980 | Johnson et al. |
| 4,229,516 A * | 10/1980 | Abel ................. C08L 27/08 430/215 |
| 4,251,255 A | 2/1981 | Wagner et al. |
| 4,434,231 A | 2/1984 | Jung |
| 4,439,488 A | 3/1984 | Trimnell et al. |
| 4,451,628 A | 5/1984 | Dammann |
| 4,471,100 A | 9/1984 | Tsubakimoto et al. |
| 4,538,532 A | 9/1985 | Coker |
| 4,652,273 A | 3/1987 | Maldonado et al. |
| 4,663,408 A | 5/1987 | Schulz et al. |
| 4,701,204 A | 10/1987 | Duvdevani et al. |
| 4,709,091 A | 11/1987 | Fukumoto et al. |
| 4,725,655 A | 2/1988 | Denzinger et al. |
| 4,808,215 A | 2/1989 | Gill et al. |
| 4,844,725 A | 7/1989 | Malouf et al. |
| 4,872,412 A | 10/1989 | Zollinger |
| 4,897,220 A | 1/1990 | Trieselt et al. |
| 4,911,736 A * | 3/1990 | Huang ................ B01F 17/0028 44/301 |
| 4,923,500 A | 5/1990 | Sylling |
| 4,929,690 A | 5/1990 | Goertz et al. |
| 4,933,098 A | 6/1990 | Gutierrez et al. |
| 4,936,897 A | 6/1990 | Pipko et al. |
| 4,952,415 A | 8/1990 | Winowiski et al. |
| 5,013,769 A | 5/1991 | Murray et al. |
| 5,024,676 A | 6/1991 | Moriyama et al. |
| 5,035,821 A | 7/1991 | Chung et al. |
| 5,047,078 A | 9/1991 | Gill |
| 5,054,434 A | 10/1991 | Wax et al. |
| 5,064,563 A | 11/1991 | Yamaguchi et al. |
| 5,106,648 A | 4/1992 | Williams |
| 5,113,619 A | 5/1992 | Leps et al. |
| 5,135,677 A | 8/1992 | Yamaguchi et al. |
| 5,188,654 A | 2/1993 | Manalastas et al. |
| 5,194,263 A | 3/1993 | Chamberlain et al. |
| 5,210,163 A | 5/1993 | Grey |
| 5,223,592 A | 6/1993 | Hughes et al. |
| 5,256,181 A | 10/1993 | Manalastas et al. |
| 5,294,651 A | 3/1994 | Stephens |
| 5,300,127 A | 4/1994 | Williams |
| 5,328,624 A | 7/1994 | Chung |
| 5,336,727 A | 8/1994 | Okazawa et al. |
| 5,391,632 A | 2/1995 | Krull et al. |
| 5,399,639 A | 3/1995 | Kimpton et al. |
| 5,427,785 A | 6/1995 | Ronson et al. |
| 5,435,821 A | 7/1995 | Duvdevani et al. |
| 5,536,311 A | 7/1996 | Rodrigues |
| 5,562,916 A | 10/1996 | Van Ooijen |
| 5,574,004 A | 11/1996 | Carr |
| 5,578,486 A | 11/1996 | Zhang |
| 5,597,400 A | 1/1997 | Nonomura et al. |
| 5,653,782 A | 8/1997 | Stern et al. |
| 5,666,905 A | 9/1997 | Mackin et al. |
| 5,681,678 A | 10/1997 | Nealey et al. |
| 5,688,907 A | 11/1997 | Wood et al. |
| 5,697,186 A | 12/1997 | Neyra et al. |
| 5,732,658 A | 3/1998 | Wolters et al. |
| 5,741,521 A | 4/1998 | Knight et al. |
| 5,760,150 A | 6/1998 | Bachus |
| 5,788,722 A | 8/1998 | Emert et al. |
| 5,916,029 A | 6/1999 | Smith et al. |
| 5,993,666 A | 11/1999 | Yamaguchi et al. |
| 5,994,265 A | 11/1999 | Barclay et al. |
| 5,997,602 A | 12/1999 | Aijala |
| 6,022,555 A | 2/2000 | DeLuca et al. |
| 6,057,398 A | 5/2000 | Blum |
| 6,100,221 A | 8/2000 | Poelker et al. |
| 6,100,224 A | 8/2000 | Peiffer et al. |
| 6,139,596 A | 10/2000 | Barth et al. |
| 6,180,589 B1 | 1/2001 | Rodrigues et al. |
| 6,187,074 B1 | 2/2001 | von Locquenghien et al. |
| 6,199,318 B1 | 3/2001 | Stewart et al. |
| 6,207,780 B1 | 3/2001 | Stockhausen et al. |
| 6,221,956 B1 | 4/2001 | Chen |
| 6,228,806 B1 | 5/2001 | Mehta |
| 6,271,191 B1 | 8/2001 | Kerobo et al. |
| 6,287,359 B1 | 9/2001 | Erhardt et al. |
| 6,309,439 B1 | 10/2001 | von Locquenghien et al. |
| 6,312,493 B1 | 11/2001 | Eltink et al. |
| 6,384,166 B1 | 5/2002 | Austin et al. |
| 6,395,051 B1 | 5/2002 | Arnold et al. |
| 6,413,292 B1 | 7/2002 | von Locquengh et al. |
| 6,444,771 B1 | 9/2002 | Yamaguchi et al. |
| 6,471,741 B1 | 10/2002 | Reinbergen |
| 6,488,734 B1 | 12/2002 | Barth et al. |
| 6,500,223 B1 | 12/2002 | Sakai et al. |
| 6,515,090 B1 | 2/2003 | Sanders et al. |
| 6,515,091 B2 | 2/2003 | Sanders et al. |
| 6,544,313 B2 | 4/2003 | Peacock et al. |
| 6,569,976 B2 | 5/2003 | Baxter et al. |
| 6,586,560 B1 | 7/2003 | Chen et al. |
| 6,632,262 B2 | 10/2003 | Gabrielson |
| 6,635,702 B1 | 10/2003 | Schmucker-Castner et al. |
| 6,653,428 B1 | 11/2003 | Klein et al. |
| 6,703,469 B2 | 3/2004 | Sanders et al. |
| 6,734,148 B2 | 5/2004 | Bell et al. |
| 6,770,616 B1 | 8/2004 | McGowan et al. |
| 6,843,846 B2 | 1/2005 | Chatterji et al. |
| 6,844,293 B1 | 1/2005 | Kirby et al. |
| 6,855,182 B2 | 2/2005 | Sears |
| 6,897,184 B2 | 5/2005 | Kurita et al. |
| 6,897,253 B2 | 5/2005 | Schmucker-Castner et al. |
| 6,930,139 B2 | 8/2005 | Sanders et al. |
| 6,936,598 B2 | 8/2005 | Khoo et al. |
| 7,004,991 B2 | 2/2006 | Narayanan et al. |
| 7,019,046 B2 | 3/2006 | Narayanan et al. |
| 7,071,259 B2 | 7/2006 | Botros |
| 7,071,275 B2 | 7/2006 | Rath et al. |
| 7,201,959 B2 | 4/2007 | Judek et al. |
| 7,217,752 B2 | 5/2007 | Schmucker-Castner et al. |
| 7,317,062 B2 | 1/2008 | Pritschins et al. |
| 7,470,304 B2 | 12/2008 | Keenan et al. |
| 7,537,705 B2 | 5/2009 | Mizuno et al. |
| 7,572,328 B2 | 8/2009 | Lettkeman et al. |
| 7,615,521 B2 | 11/2009 | Eveland et al. |
| 7,655,597 B1 | 2/2010 | Sanders |
| 7,666,241 B2 | 2/2010 | Sanders et al. |
| 7,686,863 B1 | 3/2010 | Sanders |
| 7,695,541 B1 | 4/2010 | Frizzell et al. |
| 7,923,479 B2 | 4/2011 | Champ et al. |
| 7,942,941 B2 | 5/2011 | Cravey et al. |
| 8,025,709 B2 * | 9/2011 | Sanders ................ C05B 7/00 71/11 |
| 8,043,995 B2 | 10/2011 | Sanders et al. |
| 8,097,076 B2 | 1/2012 | Göbelt et al. |
| 8,110,017 B2 | 2/2012 | Wells |
| 8,143,333 B2 | 3/2012 | Peppmoller et al. |
| 8,163,859 B2 | 4/2012 | Jeon et al. |
| 8,182,593 B2 | 5/2012 | Rapp |
| 8,192,520 B2 | 6/2012 | Sanders |
| 8,420,758 B2 | 4/2013 | Durant et al. |
| 8,430,943 B2 | 4/2013 | Sanders |
| 8,436,072 B2 | 5/2013 | Herth et al. |
| 8,491,693 B2 | 7/2013 | Burnham |
| 8,562,710 B2 | 10/2013 | Palmer et al. |
| 8,592,343 B2 | 11/2013 | Xavier et al. |
| 8,647,406 B2 | 2/2014 | Sanders |
| 8,846,817 B2 | 9/2014 | Yontz et al. |
| 9,139,481 B2 | 9/2015 | Sanders |
| 9,145,340 B2 | 9/2015 | Sanders |
| 2001/0002390 A1 | 5/2001 | Rodrigues |
| 2001/0029762 A1 | 10/2001 | Steele et al. |
| 2002/0010296 A1 | 1/2002 | Baxter et al. |
| 2002/0049139 A1 | 4/2002 | Smale |
| 2002/0132886 A1 | 9/2002 | Meffert et al. |

(56) References Cited

U.S. PATENT DOCUMENTS

| | | |
|---|---|---|
| 2003/0203825 A1 | 10/2003 | Aubay |
| 2003/0225233 A1 | 12/2003 | Dilocker et al. |
| 2004/0202634 A1 | 10/2004 | L'Alloret |
| 2004/0211234 A1 | 10/2004 | Volgas et al. |
| 2004/0226329 A1 | 11/2004 | Sanders et al. |
| 2004/0226330 A1 | 11/2004 | Sanders et al. |
| 2004/0226331 A1 | 11/2004 | Sanders et al. |
| 2004/0230020 A1 | 11/2004 | Sanders et al. |
| 2004/0265266 A1 | 12/2004 | Champ et al. |
| 2004/0266621 A1 | 12/2004 | West |
| 2005/0050931 A1 | 3/2005 | Sanders et al. |
| 2005/0090402 A1 | 4/2005 | Dieing et al. |
| 2005/0158268 A1 | 7/2005 | Schmucker-Castner et al. |
| 2006/0030486 A1 | 2/2006 | Meyer et al. |
| 2006/0069004 A1 | 3/2006 | Song et al. |
| 2006/0078526 A1 | 4/2006 | Boyd et al. |
| 2006/0191851 A1 | 8/2006 | Mizuno et al. |
| 2006/0234901 A1 | 10/2006 | Scheuing et al. |
| 2007/0027281 A1 | 2/2007 | Michl et al. |
| 2007/0161524 A1 | 7/2007 | Counradi et al. |
| 2007/0212320 A1 | 9/2007 | Demitz et al. |
| 2007/0213243 A1 | 9/2007 | Yao et al. |
| 2007/0218168 A1 | 9/2007 | Hale, III |
| 2008/0044548 A1 | 2/2008 | Hale, III |
| 2008/0173053 A1* | 7/2008 | Sanders ............... C05G 3/0076 71/27 |
| 2008/0189085 A1 | 8/2008 | Cook et al. |
| 2009/0071213 A1 | 3/2009 | Keenan et al. |
| 2009/0149364 A1 | 6/2009 | Beck |
| 2009/0151755 A1 | 6/2009 | Beck |
| 2009/0163365 A1 | 6/2009 | Bentlage et al. |
| 2009/0227451 A1 | 9/2009 | Rose et al. |
| 2009/0258786 A1 | 10/2009 | Pursell et al. |
| 2009/0270257 A1 | 10/2009 | Pursell et al. |
| 2009/0308122 A1 | 12/2009 | Shah |
| 2010/0012040 A1 | 1/2010 | Pow et al. |
| 2010/0024500 A1 | 2/2010 | Tyler |
| 2010/0099566 A1 | 4/2010 | Bobnock |
| 2010/0120617 A1 | 5/2010 | Dyllick-Brenzinger et al. |
| 2010/0122379 A1 | 5/2010 | Dieckmann et al. |
| 2010/0167975 A1 | 7/2010 | Vandermeulen et al. |
| 2010/0175443 A1 | 7/2010 | Sanders et al. |
| 2010/0175444 A1 | 7/2010 | Sanders |
| 2010/0203228 A1 | 8/2010 | Funaki et al. |
| 2010/0210802 A1 | 8/2010 | Creamer et al. |
| 2010/0234233 A1 | 9/2010 | Sannino et al. |
| 2010/0234506 A1 | 9/2010 | Elizalde et al. |
| 2010/0298526 A1 | 11/2010 | Tsumori et al. |
| 2011/0042318 A1 | 2/2011 | Painter et al. |
| 2011/0095227 A1 | 4/2011 | Herth et al. |
| 2011/0146136 A1 | 6/2011 | Waterson et al. |
| 2011/0303157 A1 | 12/2011 | Laubenstein |
| 2012/0004383 A1 | 1/2012 | Laubender et al. |
| 2012/0055414 A1 | 3/2012 | Correa |
| 2012/0065071 A1 | 3/2012 | Li et al. |
| 2012/0118575 A1 | 5/2012 | Griffin |
| 2012/0129749 A1 | 5/2012 | Detering et al. |
| 2012/0129750 A1 | 5/2012 | Detering et al. |
| 2012/0220454 A1 | 8/2012 | Chen et al. |
| 2012/0277099 A1 | 11/2012 | Olson et al. |
| 2012/0277133 A1 | 11/2012 | DiBiase et al. |
| 2013/0090240 A1 | 4/2013 | Yamaguchi et al. |
| 2013/0171737 A1 | 7/2013 | Way et al. |
| 2013/0212739 A1 | 8/2013 | Giritch et al. |
| 2014/0106023 A1 | 4/2014 | Sanders |
| 2014/0106024 A1 | 4/2014 | Sanders |
| 2014/0315716 A1 | 10/2014 | Matheny et al. |
| 2014/0342905 A1 | 11/2014 | Bullis et al. |
| 2015/0033811 A1 | 2/2015 | Sanders |
| 2016/0174547 A1 | 6/2016 | Sanders et al. |
| 2016/0174549 A1 | 6/2016 | Sanders et al. |
| 2016/0175469 A1 | 6/2016 | Sanders et al. |
| 2016/0177004 A1 | 6/2016 | Sanders et al. |
| 2016/0185678 A1 | 6/2016 | Sanders et al. |
| 2016/0272553 A1 | 9/2016 | Sanders et al. |

FOREIGN PATENT DOCUMENTS

| | | |
|---|---|---|
| CN | 1962565 A | 5/2007 |
| CN | 101423431 A | 5/2009 |
| CN | 101519324 A | 9/2009 |
| CN | 101575243 A | 11/2009 |
| CN | 101580409 | 11/2009 |
| CN | 101792348 A | 8/2010 |
| CN | 101830571 A | 9/2010 |
| CN | 101885798 A | 11/2010 |
| CN | 101885888 A | 11/2010 |
| CN | 102154013 A | 8/2011 |
| DE | 2558551 A1 | 7/1977 |
| DE | 2822488 A1 | 11/1979 |
| DE | 4122490 A1 | 1/1993 |
| DE | 4132620 A1 | 4/1993 |
| EP | 0290807 A2 | 11/1988 |
| EP | 0314070 A2 | 5/1989 |
| EP | 0337694 A2 | 10/1989 |
| EP | 0683985 A1 | 11/1995 |
| EP | 0877076 A2 | 11/1998 |
| EP | 0892111 A1 | 1/1999 |
| EP | 0976699 A1 | 2/2000 |
| EP | 1024692 A1 | 8/2000 |
| EP | 1230195 A1 | 8/2002 |
| EP | 2135854 A2 | 12/2009 |
| GB | 1324087 | 7/1973 |
| JP | 54050027 A | 4/1979 |
| JP | 54077294 A | 6/1979 |
| JP | S58131903 A | 8/1983 |
| JP | 60101194 A | 5/1985 |
| JP | 62096046 A | 5/1986 |
| JP | 61282301 A | 12/1986 |
| JP | 63083169 A | 4/1988 |
| JP | 63148937 A | 6/1988 |
| JP | 03112426 | 5/1991 |
| JP | H07215746 A | 8/1995 |
| JP | 08092591 A | 4/1996 |
| JP | 11092788 A | 4/1999 |
| JP | 2008023433 A | 2/2008 |
| RU | 2051884 C1 | 1/1996 |
| RU | 2378869 C1 | 1/2010 |
| WO | 9715367 A1 | 5/1997 |
| WO | 9918785 A1 | 4/1999 |
| WO | 9948833 A1 | 9/1999 |
| WO | 02071086 A1 | 9/2002 |
| WO | 2006131213 A1 | 12/2006 |
| WO | 2007003388 A2 | 1/2007 |
| WO | 2009060012 A2 | 5/2009 |
| WO | 2009061930 A1 | 5/2009 |
| WO | 2015031521 A1 | 3/2015 |
| WO | 2015035031 A1 | 3/2015 |
| WO | 2015116716 A1 | 8/2015 |
| WO | 2015179552 A1 | 11/2015 |
| WO | 2015179687 A1 | 11/2015 |

OTHER PUBLICATIONS

Blair. Sulphur Enhanced Fertilizer (SEF). A new generation of fertilizers. The Proceedings of the International Plant Nutrition Colloquium XVI, Department of Plant Sciences, UC Davis, [Online] 2009.

Chen, et al. *Effect of a Polymer on Mitigating Ammonia Emission from Liquid Dairy Manure*. Efekat polimera na smanjenje emisije /Polj. tehn. (Jan. 2013), 1-13.

Chiba, Lee I. *Animal Nutrition Handbook, Section 12: Poultry Nutrition and Feeding*. pp. 316-331, 2009—available online at http://www.ag.auburn.edu/%7Echibale/an12poultryfeeding.pdf.

Chien et al. *Review of Maleic-Itaconic Acid Copolymer Purported as Urease Inhibitor and Phosphorus Enhancer in Soils.*. Agronomy Journal 106(2) : 423-430, 2014.

CN Search Report in Application No. 201080047969.4 received with First Office Action dated Jul. 31, 2013.

Davidson et al. *Persistence of Rhizobium japonicum on the Soybean Seed Coat Under Controlled Temperature and Humidity*. Applied and Environmental Microbiology, 35 : 94-96, 1978.

EP Search Report 1 dated Jun. 16, 2016 in related Application No. 13847267.5.

(56) References Cited

OTHER PUBLICATIONS

EP Search Report 2 dated Jun. 10, 2016 in related Application No. 16161777.4.
EP Search Report 3 dated Jun. 13, 2016 in related Application No. 16161780.8.
EP Search Report 4 dated Jul. 26, 2016 in related Application No. 16161783.2.
EP Search Report 5 dated Jun. 13, 2016 in related Application No. 16161786.5.
EP Search Report 6 dated Jun. 20, 2016 in related Application No. 16161785.7.
Gay, et al. *Ammonia Emissions and Animal Agriculture*. Virginia Cooperative Extension, Publication 442-110, Virginia Polytechnic Institute and State University, 2009.
*Grains/Fertilizers*, article found online at martinsachs.angelfire.com/feeding.html, dated Apr. 11, 2010.
Groenstein, C.M. et al. *Measures to Reduce Ammonia Emissions from Livestock Manures; Now, Soon, Later*. Wageningen UK Livestock Research; Report 488; Jun. 2011.
Herrington et al. *Rheological modification of bitumen with maleic anhydride and dicarboxylic acids*. Fuel, 78 : 101-110, 1999.
International Preliminary Report on Patentability 1 in corresponding application PCT/US 2014/052987, dated Mar. 10, 2016.
International Preliminary Report on Patentability 2 in related application PCT/US 2014/054069, dated Dec. 11, 2014.
International Search Report and Written Opinion 1 in related application PCT/US 2010/050244, dated Jun. 27, 2011.
International Search Report and Written Opinion 2 in related application PCT/US 2013/064378, dated Jan. 23, 2014 (Note: for cited reference RU2375063, see U.S. Pat. No. 6,936,598).
International Search Report and Written Opinion 3 in related application PCT/US 2013/054373, dated Dec. 12, 2013.
International Search Report and Written Opinion 4 in corresponding application PCT/US 2014/052987, dated Jan. 16, 2015.
International Search Report and Written Opinion 5 in related application PCT/US 2014/054069, dated Dec. 11, 2014.
International Search Report and Written Opinion 6 in related application PCT/US 2014/049451, dated Dec. 18, 2014.
International Search Report and Written Opinion 7 in related application PCT/US 2014/039424, dated Oct. 16, 2014.
International Search Report and Written Opinion 8 in related application PCT/US 2015/013345, dated Apr. 13, 2015.
International Search Report and Written Opinion 9 in related application PCT/US 2015/032037, dated Aug. 28, 2015.
International Search Report and Written Opinion 10 in related application PCT/US 2015/031823, dated Aug. 28, 2015.
Jung et al. *Polymer-entrapped rhizobium as an inoculants for legumes*. Plant and Soil, 65 : 219-231, 1982.
Kahraman et al. *Bioengineering Polyfunctional Copolymers. VII. Synthesis and characterization of copolymers of p-vinylphenyl boronic acid with maleic and citraconic anhydrides and their self-assembled macrobranched supramolecular architectures*. Polymer 45 :5813-5828, 2004.
Kejun et al., *Copolymerization of cis-Butenedioic Acid with Sodium Methallylsulfonate in Aqueous Solution*. J. App. Poly. Sci., vol. 40 : 1529-1539; 1990.
Li et al. *Dispersion and Rheological Properties of Concentrated Kaolin Suspensions with Polycarboxylate Copolymers Bering Comb-like Side Chains*. Journal of the European Ceramic Society, 34(1) :137-146, Jan. 2014.

Machida et al. *Water Soluble Polymers. Ix. N-(2-chloroethyl)-sulfonamides of Styrene-maleic Acid and Styrene-itaconic Acid Copolymers*. Sen'i Gakkaishi 22(6) :269-73,1996.
Mohan, Prasanthrajan et al. *Addressing the Challenges of Ammonia Loss from Poultry Droppings through Indigenous Carbon Wastes*. International Journal of Environmental Science and Development, 3 (4), Aug. 2012—available online at http://www.ijesd.org/papers/255-D590.pdf.
Naga et al. *Polymeric Additives for Pour Point Depression of Residual Fuel Oils*. J. Chem. Tech. Biotechnol. 35A : 241-247, 1985.
Patterson, Paul H. *Hen House Ammonia: Environmental Consequences and Dietary Strategies*. Multi-State Poultry Meeting, May 14-16, 2002—available online at http://www.ijesd.org/papers/255-D590.pdf.
Powers, Wendy. *Practices to Reduce Ammonia*. 2004—available online at http://www.thepoultrysite.com/articles/219/practices-to-reduce-ammonia.
Prochnow, L.I. et al. *Controlling Ammonia Losses During Manure Composting with the Addition of Phosphogypsum and Simple Superphosphate*. Sci.Agri., Piracicaba, 52(2) :346-349, mai/ago 1995.
Puoci et al. *Polymer in Agriculture: a Review*. American Journal of Agricultural and Biological Sciences, 3 :299-314, 2008.
Sanderson, et al. *Effect of Gypsum and Elemental Sulphur on Calcium and Sulphur Content of Rutabagas in Podzolic Soils*. Can J Plan Sci [Online], pp. 785-788, 2002.
Shakkthivel et al. *Newly Developed Itaconic Acid Copolymers for Gypsum and Calcium Carbonate Scale Control*. Journal of Applied Polymer Science, 103(5) :3206-3213, 2007.
Singh, A. et al. *Efficacy of Urease Inhibitor to Reduce Ammonia Emission from Poultry Houses*. J. Appl. Poult. Res., 18 :34-42, 2009—available online at http://japr.fass.org/content/18/1/34.full.
*Sodium Lignosulphonate*. Available online at www.xyd-chem.com on Apr. 20, 2010.
US Provisional Patent Application entitled Polyanionic Polymers, U.S. Appl. No. 62/001,110, filed May 21, 2014.
Weir, B.S. The current taxonomy of rhizobia. NZ Rhizobia website. http://www.rhizobia.co.nz/taxonomy/rhizobia; Partial update: May 2, 2013.
Yang, Charles Q. et al. *In-situ Polymerization of Maleic Acid and Itaconic Acid and Crosslinking of Cotton Fabric*. Textile Research Journal, 69(10) :782-789, 1999.
Yang, Charles Q. et al. *In-situ Polymerization of Maleic Acid and Itaconic Acid on Cotton: MALDI/TOF Mass Spectroscopy and Light-Scattering Study*. Textile Research Journal, 70(4) :359-62, 2000.
Yanhe et al. *Synthesis and Performance of Itaconic Acid-Maleic Acid Copolymer*. .Indus. Wat. Treat. 2006 10, pagination unknown. DOI: cnki:ISSN:1005-829X.0.2006-10-017.
Yasmin, et al. *Effect of Elemental Sulfur, Gypsum, and Elemental Sulfur Coated Fertilizers on the Availability of Sulfur to Rice*. J Plant Nutr [Online], 20(1): 79-91, 2007.
Zhang et al. *Synthesis and Inhibition Efficiency of a Novel Quadripolymer Inhibitor*. Chin. J. Ch. E. 15(4) :600; 2007.
PCT International Search Report and Written Opinion from PCT Application No. PCT/US2015/031823 entitled Polymeric Compositions (dated Aug. 28, 2015).
Chien, S.H. et al.; "Review of Maleic-itaconic acid copolymer purported as urease inhibitor and phosphorus enhancer in soils;" Agronomy Journal, vol. 106, Issue 2 (Mar. 6, 2014).

\* cited by examiner

POLYMERIC COMPOSITIONS

CROSS-REFERENCE TO RELATED APPLICATION

This is a National Phase Application pursuant to 35 U.S.C. § 371 of International Application No. PCT/US2015/031823, filed May 20, 2015, which claims benefit of U.S. Provisional application Ser. No. 62/002,021, filed May 22, 2014, each of which is incorporated herein by reference in its entirety.

BACKGROUND OF THE INVENTION

Field of the Invention

The present invention is broadly concerned with polymer compositions adapted useful in a variety of agricultural and non-agricultural contexts. More particularly, the invention is concerned with such compositions characterized by water solubility through use of an anionic polymer component and a high molecular weight component, whereby the compositions may be applied to solid fertilizers and used in other contexts to improve the performance of a variety of products. In the case of fertilizers, the compositions of the invention serve to minimize the presence and generation of fertilizer fines and, in preferred forms, are capable of absorbing moisture from soil, and enhance fertilizer uptake by plants.

Description of the Prior Art

For a number of years, Specialty Fertilizer Products, LLC of Leawood, Kans., has commercialized a series of aqueous dispersions of maleic-itaconic copolymers in partial salt form. These products include AVAIL® for use with granular and liquid fertilizers (respectively the partial sodium and ammonium salts), and NUTRISPHERE-N® for use with granular and liquid fertilizers (the partial calcium salt). For example, such products may be sprayed or otherwise applied to the surface of solid fertilizers, such as urea, ammonium salts, monoammonium phosphate (MAP), diammonium phosphate (DAP), and gypsum, or mixed with liquid fertilizers, such as UAN and ammonium polyphosphate.

These prior products have been shown to have a number of outstanding agricultural properties, including the ability to enhance the uptake of fertilizer nutrients (e.g., phosphates, nitrogen, potassium, and micronutrients), to act as adjuvants for pesticides such as glyphosate herbicides, and, when supplemented with an organic drying agent, to very quickly dry when applied to solid fertilizers, thereby facilitating production of final coated solid fertilizer products. Moreover, the preferred copolymers have been shown to have enhanced activity when fertilizer formulations containing both the calcium and sodium copolymer partial salts are employed (U.S. Patent Publication No. 2009-0217723). This technology is also described in U.S. Pat. Nos. 6,515,090, 7,655,597, 7,736,412, and 8,043,995, and related patents.

These polymeric products are commonly used with solid fertilizers (typically in the form of granules) by spraying aqueous dispersions of the polymers directly onto the fertilizer surfaces. This application is usually carried out by fertilizer dealers, so that the coated fertilizers are shipped to growers to be field-applied. During granule manufacture, handling, and transport before and after coating, significant fines can be generated, up to 4% by weight. These fines represent a material loss to everyone in the supply chain and the end users. Therefore, if a way could be found to minimize these fines, or to agglomerate the fines with the coated fertilizer granules, this would be a distinct advantage.

Solid fertilizers have heretofore been treated with fines control materials, such as those sold by the Arr-Maz Co. of Mulberry, Fla. under the designations "Dustrol," and "Galoryl." These and many other such coatings are viscous and primarily hydrocarbon-based, and generally require that the compositions be heated prior to fertilizer application. Therefore, use of these coatings inevitably leads to hydrocarbon contamination in soils, which has many adverse environmental consequences. In recent years, there have been attempts to provide water-borne and water-based fertilizer coatings, but these have generally not performed as well as the prior hydrocarbon formulations in terms of fines control.

In many fertilizer uses, it would be desirable to have a polymeric composition which effectively controls fines without the use of significant quantities of hydrocarbon-based materials. In further aspects, such polymeric compositions may be formulated so as to be capable of absorbing water from soil or the ambient environment. For example, if seeds were coated using such a composition, seed germination would be enhanced owing to the ability of the coating composition to absorb water from the soil. Similarly, animal feeds and fertilizer products could be improved through the presence of such water-absorbing materials.

SUMMARY OF THE INVENTION

The present invention provides water soluble polymeric compositions which include at least one polyanionic polymer component, and at least one high molecular weight component selected from the group consisting of a copolymer different than said polyanionic polymer, a cellulose or cellulose derivative having at least an average of about 0.9 carboxylate groups per cellulose repeat unit, and mixtures thereof. The compositions in aqueous solution may be applied to solid fertilizers to control dust and fines, without the presence of any substantial quantities of hydrocarbons therein. Moreover, the preferred compositions enhance the uptake of fertilizer nutrients by plants.

In preferred forms, the polyanionic component is a copolymer including maleic and itaconic repeat units, with optional sulfonate repeat units. The preferred high molecular weight component is a copolymer having dicarboxylate repeat units and repeat units selected from the group consisting of straight or branched chain C1-C12 alkylenes, straight or branched chain C1-C8 alkyl vinyl ethers, and mixtures thereof. As used herein, "copolymer" refers to a polymer including at least two different types of repeat units or monomers, and also higher-order polymers containing three or more different repeat units.

The compositions of the invention may also include optional ingredients such as non-aqueous, hydroxyl-containing solvents, mineral particles, biostats, opacifiers, colorants, markers, fillers, pigments, dyes, and compounds to control the freezing point of the composition, and mixtures thereof.

The compositions of the invention can also be used to reduce evolution of ammonia from animal manures, such as by adding the compositions to manure pits, field-applied manure, manure collected in or below animal containment facilities, and manures in any form such as dried, powder, granule, pellet, fragment, or any other solid or semi-solid state. The compositions may also be used to enhance the performance of pesticides or as amendments to animal feeds or waters.

DETAILED DESCRIPTION OF THE PREFERRED EMBODIMENTS

In one important aspect of the invention, polymeric compositions are provided which are particularly suited for agricultural uses, and especially as fertilizer coatings, which provide improved performance, e.g., enhanced control of undesirable dust or fines without the necessity of using any significant quantity of hydrocarbon material that may be released into the environment. To this end, the compositions of the invention are in the form of high-viscosity aqueous dispersions or solutions containing at least two components, namely: (1) one or more polyanionic polymers, preferably in the partial or complete salt forms thereof; and (2) a high-molecular weight (HMW) component in the form of one or more of (a) a copolymer different than the (1) polyanionic polymers and containing dicarboxylic acid and/or anhydride repeat units and with weight averaged molecular weight of at least about 100,000, and more preferably from about 200,000-500,000, and/or (b) cellulose or a cellulose derivative having at least an average of about 0.9 carboxylate groups per cellulose repeat unit.

The pH of the aqueous compositions of the invention can be varied depending upon the desired end uses thereof. The aqueous compositions of the invention normally have a water content of from about 10-95% w/w, most preferably from about 15-75% w/w, and correspondingly a solids content of from about 5-90% w/w, most preferably from about 25-85% w/w. The (1) polyanionic polymer fraction of the complete compositions can range from about 1-80% w/w, and more preferably from about 5-60% w/w, whereas the HMW fraction should be present at a level of from about 0.1-40% w/w, more preferably from about 2-20% w/w. All of the aforementioned percentages are based upon the total weight of the entire aqueous composition taken as 100% by weight. In such compositions, pH levels of about 2-13 are useful, and more preferably the pH should be in the range of about 4-9.

Especially preferred compositions include a (1) polyanionic polymer component in the form of one or more maleic-itaconic copolymers, together with an HMW component in the form of one or more (2)(a) copolymers, the latter polymerized to have about a 1:1 mole ratio of maleic (acid, anhydride, or salt) repeat units, with one or more alkylene and/or alkyl vinyl ether repeat units. The preferred compositions are biodegradable and true homogeneous solutions, which are substantially stable and free of large amounts of precipitates when stored for at least 12 months and more preferably at least about 24 months at room temperature after preparation thereof. Further, the compositions are preferably substantially free of hydrocarbons, i.e., no more than about 5% by weight thereof, more preferably no more than about 1% by weight thereof, and most preferably essentially free of hydrocarbons.

In one particular utility, the complete compositions are applied by any convenient technique to the surfaces of solid fertilizers (e.g., granules), and, when "wet," serve to control dust and/or fines by attaching smaller particles to larger granules through an adhesion process. Moreover, once the compositions dry, they form relatively hard, non-sticking surfaces on the coated fertilizers, which resist breakup and creation of fines during subsequent handling of the fertilizer solids. These dried coatings also retain their water solubility and biodegradability, so that the beneficial effects of the polyanionic polymer components can still be realized. Moreover, the coatings prevent agglomeration of the individual coated bodies, and thereby preserve the free-flowing characteristics thereof.

Fertilizer compositions made in accordance with the invention can be made by applying to any solid material used for plant nutrition, or mixing with, into, on, or impregnating, or otherwise contacting with such material, coating composition(s) described herein, and then allowing the resulting compositions to dry over a suitable period of time. The application of coating compositions may occur once or a number of times. As part of the application process, this solid material may be subjected to agitation or other handling. The application of coating compositions may occur at room temperature or at other temperatures, depending on equipment and purposes intended; this is well known to the coating art.

Compositions of the invention designed to be applied at ambient or only slightly elevated temperatures, e.g., 20-30° C., should have relatively low viscosities. Hence, 30% w/w pure water solutions of the complete compositions of the invention for low-temperature applications should preferably have a viscosity less than about 1,000 centipoise (cps) at 20° C. (more preferably less than about 500 cps, and most preferably from about 100-400 cps), and should also be essentially completely water soluble in 20° C. water up to saturation.

However, it may be desired to apply the complete compositions at an elevated temperature so as to render the composition less viscous during handling, and then allowing the composition to cool and become more viscous. This is useful for controlling dust and fines by way of "sticking" those smaller particles to larger granules present. Therefore, coating compositions designed for application at elevated temperatures of, e.g., 60-80° C. and above, should have a viscosity of at least about 1000 cps at about 20° C., and more preferably, a viscosity greater than about 2000 cps at about 20° C.

Accordingly, the viscosity of the compositions of the invention will preferably range from about 100 cps to above about 2000 cps; with a more preferably range being from about 200-2000 cps.

The various aspects of the coating compositions and the final products are described individually below. Unless otherwise indicated, all weight % values are based upon the total weight of the composition or product in question being taken as 100% by weight.

The Polyanionic Polymers

Generally speaking, the polyanionic polymers of the invention should contain at least three and preferably more repeat units per molecule (preferably from about 10-500). Moreover, the partial or complete salts of the polymers should be water dispersible and preferably water soluble, i.e., they should be dispersible or soluble in pure water to a level of at least about 5% w/w at room temperature with mild agitation.

Advantageously, at least about 50% (by mole) of repeat units contain at least 1 carboxylate group. These species also are typically capable of forming stable solutions in pure water up to at least about 20% w/w solids at room temperature.

The preferred polyanionic polymers of the invention have the following additional characteristics:
    The polymers should have a significant number of anionic functional groups, preferably at least about 90 mole percent by weight, more preferably at least about 96 mole percent by weight, and most preferably the polymers are essentially free of non-anionic functional groups.
    The polymers are stable thermally and chemically for convenient use.
    The polymers should be essentially free of ester groups, i.e., no more than about 5 mole percent thereof, and most preferably no more than about 1 mole percent.

The polymers should have only a minimum number of amide-containing repeat units, preferably no more than about 10 mole percent thereof, and more preferably no more than about 5 mole percent.

The polymers should have only a minimum number of monocarboxylate repeat units, preferably no more than about 10 mole percent thereof, and more preferably no more than about 5 mole percent.

The ensuing detailed description of preferred polyanionic polymers makes use of the art-accepted term "repeat units" to identify the moieties in the polymers. As used herein, "repeat unit" refers to chemically converted forms (including isomers and enantiomers) of initially chemically complete monomer molecules, where such repeat units are created during polymerization reactions, with the repeat units bonding with other repeat units to form a polymer chain. Thus, a type B monomer will be converted to a type B repeat unit, and type C and type G monomers will be converted type C and G repeat units, respectively. For example, the type B maleic acid monomer will be chemically converted owing to polymerization conditions to the corresponding type B maleic acid repeat unit, as follows:

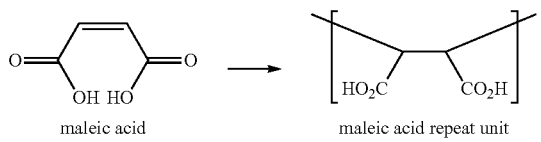

maleic acid → maleic acid repeat unit

Different monomers within a given polymerization mixture are converted to corresponding repeat units, which bond to each other in various ways depending upon the nature of the repeat groups and the polymerization reaction conditions, to create the final polymer chain, apart from end groups.

Generally speaking, all carboxylate- and sulfonate-containing copolymers are within the scope of the invention. For example, carboxylate repeat units derived from itaconic and/or maleic moieties are suitable, as are alkylallyl sulfonate repeat units, e.g., methallyl sulfonate. However, in carrying out the invention, it has been determined that certain specific families or classes of polyanionic polymers are particularly suitable. These are described below as "Class I," "Class IA," and "Class II" polymers. Of course, mixtures of these polymer classes are also contemplated.

Class I Polyanionic Polymers

The Class I polyanionic polymers of the present invention are at least tetrapolymers, i.e., they are composed of at least four different repeat units individually and independently selected from the group consisting of type B, type C, and type G repeat units, and mixtures thereof, described in detail below. However, the Class I polymers comprehend polymers having more than four distinct repeat units, with the excess repeat units being selected from the group consisting of type B, type C, and type G repeat units, and mixtures thereof, as well as other monomers or repeat units not being type B, C, or G repeat units.

Preferred Class I polymers contain at least one repeat unit from each of the B, C, and G types, one other repeat unit selected from the group consisting of type B, type C, and type G repeat units, and optionally other repeat units not selected from type B, type C, and type G repeat units. Particularly preferred polymers comprise a single type B repeat unit, a single type C repeat unit, and two different type G repeat units, or two different type B repeat units, a single type C repeat unit, and one or more different type G repeat units.

However constituted, preferred Class I polymers contain at least about 90 mole percent (more preferably at least about 96 mole percent) of repeat units selected from the group consisting of type B, C, and G repeat units (i.e., the polymers should contain no more than about 10 mole percent (preferably no more than about 4 mole percent) of repeat units not selected from types B, C, and G).

The Class I polymers are easily converted to partial or fully saturated salts by a simple reaction with an appropriate salt-forming cation compound. Usable cations can be simple cations such as sodium, but more complex cations can also be used, such as cations containing a metal atom and other atom(s) as well, e.g., vanadyl cations. Among preferred metal cations are those derived from alkali, alkaline earth, and transition metals. The cations may also be amines (as used herein, "amines" refers to primary, secondary, or tertiary amines, monoamines, diamines, and triamines, as well as ammonia, ammonium ions, quaternary amines, quaternary ammonium ions, alkanolamines (e.g., ethanolamine, diethanolamine, and triethanolamine), and tetraalkylammonium species). The most preferred class of amines are alkyl amines, where the alkyl group(s) have from 1-30 carbon atoms and are of straight or branched chain configuration. Such amines should be essentially free of aromatic rings (no more than about 5 mole percent aromatic rings, and more preferably no more than about 1 mole percent thereof). A particularly suitable alkyl amine is isopropylamine. These possible secondary cations should be reacted with no more than about 10 mole percent of the repeat units of the polymer.

1. Type B Repeat Units

Type B repeat units are dicarboxylate repeat units derived from monomers of maleic acid and/or anhydride, fumaric acid and/or anhydride, mesaconic acid and/or anhydride, substituted maleic acid and/or anhydride, substituted fumaric acid and/or anhydride, substituted mesaconic acid and/or anhydride, mixtures of the foregoing, and any isomers, esters, acid chlorides, and partial or complete salts of any of the foregoing. As used herein with respect to the type B repeat units, "substituted" species refers to alkyl substituents (preferably C1-C6 straight or branched chain alkyl groups substantially free of ring structures), and halo substituents (i.e., no more than about 5 mole percent of either ring structures or halo substituents, preferably no more than about 1 mole percent of either); the substituents are normally bound to one of the carbons of a carbon-carbon double bond of the monomer(s) employed. In preferred forms, the total amount of type B repeat units in the Class I polymers of the invention should range from about 1-70 mole percent, more preferably from about 20-65 mole percent, and most preferably from about 35-55 mole percent, where the total amount of all of the repeat units in the Class I polymer is taken as 100 mole percent.

Maleic acid, methylmaleic acid, maleic anhydride, methylmaleic anhydride, and mesaconic acid (either alone or as various mixtures) are the most preferred monomers for generation of type B repeat units. Those skilled in the art will appreciate the usefulness of in situ conversion of acid anhydrides to acids in a reaction vessel just before or even during a reaction. However, it is also understood that when corresponding esters (e.g., maleic or citraconic esters) are used as monomers during the initial polymerization, this should be followed by hydrolysis (acid or base) of pendant ester groups to generate a final carboxylated polymer substantially free of ester groups.

2. Type C Repeat Units

Type C repeat units are derived from monomers of itaconic acid and/or anhydride, substituted itaconic acid and/or anhydride, as well as isomers, esters, acid chlorides, and partial or complete salts of any of the foregoing. The type C repeat units are present in the preferred Class I polymers of the invention at a level of from about 1-80 mole percent, more preferably from about 15-75 mole percent, and most preferably from about 20-55 mole percent, where the total amount of all of the repeat units in the polymer is taken as 100 mole percent.

The itaconic acid monomer used to form type C repeat unit has one carboxyl group, which is not directly attached to the unsaturated carbon-carbon double bond used in the polymerization of the monomer. Hence, the preferred type C repeat unit has one carboxyl group directly bound to the polymer backbone, and another carboxyl group spaced by a carbon atom from the polymer backbone. The definitions and discussion relating to "substituted," "salt," and useful salt-forming cations (metals, amines, and mixtures thereof) with respect to the type C repeat units, are the same as those set forth for the type B repeat units.

Unsubstituted itaconic acid and itaconic anhydride, either alone or in various mixtures, are the most preferred monomers for generation of type C repeat units. Again, if itaconic anhydride is used as a starting monomer, it is normally useful to convert the itaconic anhydride monomer to the acid form in a reaction vessel just before or even during the polymerization reaction. Any remaining ester groups in the polymer are normally hydrolyzed, so that the final carboxylated polymer is substantially free of ester groups.

3. Type G Repeat Units

Type G repeat units are derived from substituted or unsubstituted sulfonate-bearing monomers possessing at least one carbon-carbon double bond and at least one sulfonate group, in acid, partial or complete salt, or other form, and which are substantially free of aromatic rings and amide groups (i.e., no more than about 5 mole percent of either aromatic rings or amide groups, preferably no more than about 1 mole percent of either). The type G repeat units are preferably selected from the group consisting of C1-C8 straight or branched chain alkenyl sulfonates, substituted forms thereof, and any isomers or salts of any of the foregoing; especially preferred are alkenyl sulfonates selected from the group consisting of vinyl, allyl, and methallylsulfonic acids or salts. The total amount of type G repeat units in the Class I polymers of the invention should range from about 0.1-65 mole percent, more preferably from about 1-35 mole percent, and most preferably from about 1-25 mole percent, where the total amount of all of the repeat units in the Class I polymer is taken as 100 mole percent. The definitions and discussion relating to "substituted," "salt," and useful salt-forming cations (metals, amines, and mixtures thereof) with respect to the type G repeat units, are the same as those set forth for the type B repeat units.

Vinylsulfonic acid, allylsulfonic acid, and methallylsulfonic acid, either alone or in various mixtures, are deemed to be the most preferred monomers for generation of type G repeat units. It has also been found that alkali metal salts of these acids are also highly useful as monomers. In this connection, it was unexpectedly discovered that during polymerization reactions yielding the novel polymers of the invention, the presence of mixtures of alkali metal salts of these monomers with acid forms thereof does not inhibit completion of the polymerization reaction.

Further Preferred Characteristics of the Class I Polyanionic Polymers

As noted previously, the total abundance of type B, C, and G repeat units in the Class I polymers of the invention is preferably at least about 90 mole percent, more preferably at least about 96 mole percent, and most preferably the polymers consist essentially of or are 100 mole percent B, C, and G-type repeat units. It will be understood that the relative amounts and identities of polymer repeat units can be varied, depending upon the specific properties desired in the resultant polymers. Moreover, it is preferred that the Class I polymers of the invention contain no more than about 10 mole percent of any of (i) non-carboxylate olefin repeat units, (ii) ether repeat units, (iii) ester repeat units, (iv) non-sulfonated monocarboxylic repeat units, and (v) amide-containing repeat units. "Non-carboxylate" and "non-sulfonated" refers to repeat units having essentially no carboxylate groups or sulfonate groups in the corresponding repeat units, namely less that about 55 by weight in the repeat units. Advantageously, the mole ratio of the type B and type C repeat units in combination to the type G repeat units (that is, the mole ratio of (B+C)/G) should be from about 0.5-20:1, more preferably from about 2:1-20:1, and still more preferably from about 2.5:1-10:1. Still further, the polymers should be essentially free (e.g., less than about 1 mole percent) of alkyloxylates or alkylene oxide (e.g., ethylene oxide)-containing repeat units, and most desirably entirely free thereof.

The preferred Class I polymers of the invention have the repeat units thereof randomly located along the polymer chain without any ordered sequence of repeat units. Thus, the polymers hereof are not, e.g., alternating with different repeat units in a defined sequence along the polymer chain.

It has also been determined that the preferred Class I polymers of the invention should have a very high percentage of the repeat units thereof bearing at least one anionic group, e.g., at least about 80 mole percent, more preferably at least about 90 mole percent, and most preferably at least about 95 mole percent. It will be appreciated that the B and C repeat units have two anionic groups per repeat unit, whereas the preferred sulfonate repeat units have one anionic group per repeat unit.

For a variety of applications, certain tetrapolymer compositions are preferred, i.e., a preferred polymer backbone composition range (by mole percent, using the parent monomer names of the corresponding repeat units) is: maleic acid 35-50%; itaconic acid 20-55%; methallylsulfonic acid 1-25%; and allylsulfonic sulfonic acid 1-20%, where the total amount of all of the repeat units in the polymer is taken as 100 mole percent. It has also been found that even small amounts of repeat units, which are neither B nor C repeat units, can significantly impact the properties of the final polymers, as compared with prior BC polymers. Thus, even 1 mole percent of each of 2 different G repeat units can result in a tetrapolymer exhibiting drastically different behaviors, as compared with BC polymers.

The molecular weight of the polymers is also highly variable, again depending principally upon the desired properties. Generally, the molecular weight distribution for polymers in accordance with the invention is conveniently measured by size exclusion chromatography. Broadly, the molecular weight of the polymers ranges from about 800-50,000, and more preferably from about 1000-5000. For some applications, it is advantageous that at least 90% of the finished polymer be at or above a molecular weight of about 1000 measured by size exclusion chromatography in 0.1 M sodium nitrate solution via refractive index detection at 35°

C. using polyethylene glycol standards. Of course, other techniques for such measurement can also be employed.

Especially preferred Class I polymers include the following repeat units: maleic—from about 30-55 mole percent, more preferably from about 40-50 mole percent, and most preferably about 45 mole percent; itaconic—from about 35-65 mole percent, more preferably from about 40-60 mole percent, and most preferably about 50 mole percent; methallylsulfonic—from about 1-7 mole percent, more preferably from about 3-6 mole percent, and most preferably about 4 mole percent; and allylsulfonic—from about 0.1-3 mole percent, more preferably from about 0.5-2 mole percent, and most preferably about 1 mole percent. This type of polymer is typically produced as a partial alkali metal salt (preferably sodium) at a pH of from about 0.2-3, more preferably from about 0.3-2, and most preferably about 1. The single most preferred polymer of this type is a partial sodium salt having a pH of about 1, with a repeat unit molar composition of maleic 45 mole percent, itaconic 50 mole percent, methallylsulfonic 4 mole percent, and allylsulfonic 1 mole percent. This specific polymer is referred to herein as the "T5" polymer.

Syntheses of the Class I Polyanionic Polymers

Virtually any conventional method of free radical polymerization may be suitable for the synthesis of the Class I polymers of the invention. However, a preferred and novel synthesis may be used, which is applicable not only for the production of the Class I polymers of the invention, but also for the synthesis of polymers containing dicarboxylate repeat units and sulfonate repeat units and preferably containing at least one carbon-carbon double bond. Such types of polymers are disclosed in U.S. Pat. Nos. 5,536,311 and 5,210,163.

Generally speaking, the new synthesis methods comprise carrying out a free radical polymerization reaction between dicarboxylate and sulfonate repeat units in the presence of hydrogen peroxide and vanadium-containing species to achieve a conversion to polymer in excess of 90%, and more preferably in excess of 98%, by mole. That is, a dispersion of the dicarboxylate and sulfonated monomers is created and free radical initiator(s) are added followed by allowing the monomers to polymerize.

Preferably, the hydrogen peroxide is the sole initiator used in the reaction, but in any case, it is advantageous to conduct the reaction in the absence of any substantial quantities of other initiators (i.e., the total weight of the initiator molecules used should be about 95% by weight hydrogen peroxide, more preferably about 98% by weight, and most preferably 100% by weight thereof). Various sources of vanadium may be employed, with vanadium oxysulfates being preferred.

It has been discovered that it is most advantageous to perform these polymerization reactions in substantially aqueous dispersions (e.g., at least about 95% by weight water, more preferably at least about 98% by weight water, and most preferably 100% by weight water). The aqueous dispersions may also contain additional monomer, but only to the minor extent noted.

It has also been found that the preferred polymerization reactions may be carried out without the use of inert atmospheres, e.g., in an ambient air environment. As is well known in the art, free radical polymerization reactions in dispersions are normally conducted in a way that excludes the significant presence of oxygen. As a result, these prior techniques involve such necessary and laborious steps as degassing, inert gas blanketing of reactor contents, monomer treatments to prevent air from being present, and the like. These prior expedients add to the cost and complexity of the polymerizations, and can present safety hazards. However, in the polymerizations of the polymers of the present invention, no inert gas or other related steps are required, although they may be employed if desired.

One preferred embodiment comprises creating highly concentrated aqueous dispersions of solid monomer particles (including saturated dispersions containing undissolved monomers) at a temperature of from about 50-125° C., more preferably from about 75-110° C., and adding vanadium oxysulfate to give a vanadium concentration in the dispersion of from about 1-1000 ppm, and more preferably from about 5-500 ppm (metals basis). This is followed by the addition of hydrogen peroxide over a period of from about 30 minutes-24 hours (more preferably from about 1-5 hours) in an amount effective to achieve polymerization. This process is commonly carried out in a stirred tank reactor equipped with facilities for controlling temperature and composition, but any suitable equipment used for polymerization may be employed.

Another highly preferred and efficient embodiment involves charging a stirred tank reactor with water, followed by heating and the addition of monomers to give a dispersion having from about 40-75% w/w solids concentration. Where maleic and/or itaconic monomers are employed, they may be derived either from the corresponding acid monomers, or from in situ conversion of the anhydrides to acid in the water. Carboxylate and sulfonated monomers are preferred in their acid and/or anhydride form, although salts may be used as well. Surprisingly, it has been found that incomplete monomer dissolution is not severely detrimental to the polymerization; indeed, the initially undissolved fraction of monomers will dissolve at some time after polymerization has been initiated.

After the initial heating and introduction of monomers, the reactor contents are maintained at a temperature between about 80-125° C., with the subsequent addition of vanadium oxysulfate. Up to this point in the reaction protocol, the order of addition of materials is not critical. After introduction of vanadium oxysulfate, a hydrogen peroxide solution is added over time until substantially all of the monomers are converted to polymer. Peroxide addition may be done at a constant rate, a variable rate, and with or without pauses, at a fixed or variable temperature. The concentration of peroxide solution used is not highly critical, although the concentration on the low end should not dilute the reactor contents to the point where the reaction becomes excessively slow or impractically diluted. On the high end, the concentration should not cause difficulties in performing the polymerization safely in the equipment being used.

Preferably, the polymerization reactions of the invention are carried out to exclude substantial amounts of dissolved iron species (i.e., more than about 5% by weight of such species, and more preferably substantially less, on the order of below about 5 ppm, and most advantageously under about 1 ppm). This is distinct from certain prior techniques requiring the presence of iron-containing materials. Nonetheless, it is acceptable to carry out the polymerization of the invention in 304 or 316 stainless steel reactors. It is also preferred to exclude from the polymerization reaction any significant amounts (nor more than about 5% by weight) of the sulfate salts of ammonium, amine, alkali and alkaline earth metals, as well as their precursors and related sulfur-containing salts, such as bisulfites, sulfites, and metabisulfites. It has been found that use of these sulfate-related compounds leaves a relatively high amount of sulfates and the like in the final polymers, which either must be separated or left as a product contaminant.

The high polymerization efficiencies of the preferred syntheses result from the use of water as a solvent and without the need for other solvents, elimination of other initiators (e.g., azo, hydroperoxide, persulfate, organic peroxides) iron and sulfate ingredients, the lack of recycling loops, so that substantially all of the monomers are converted to the finished polymers in a single reactor. This is further augmented by the fact that the polymers are formed first, and subsequently, if desired, partial or complete salts can be created.

EXAMPLES

The following examples describe preferred synthesis techniques for preparing polyanionic polymers; it should be understood, however, that these examples are provided by way of illustration only and nothing therein should be taken as a limitation on the overall scope of the invention.

Example 1

Exemplary Synthesis

Apparatus:

A cylindrical reactor was used, capable of being heated and cooled, and equipped with efficient mechanical stirrer, condenser, gas outlet (open to atmosphere), solids charging port, liquids charging port, thermometer and peroxide feeding tube.

Procedure: Water was charged into the reactor, stirring was initiated along with heating to a target temperature of 95° C. During this phase, itaconic acid, sodium methallylsulfonate, sodium allylsulfonate, and maleic anhydride were added so as to make a 50% w/w solids dispersion with the following monomer mole fractions:

maleic: 45%
itaconic: 35%
methallylsulfonate: 15%
allylsulfonate: 5%

When the reactor temperature reached 95° C., vanadium oxysulfate was added to give a vanadium metal concentration of 25 ppm by weight. After the vanadium salt fully dissolved, hydrogen peroxide (as 50% w/w dispersion) was added continuously over 3 hours, using the feeding tube. The total amount of hydrogen peroxide added was 5% of the dispersion weight in the reactor prior to peroxide addition. After the peroxide addition was complete, the reactor was held at 95° C. for two hours, followed by cooling to room temperature.

The resulting polymer dispersion was found to have less than 2% w/w total of residual monomers as determined by chromatographic analysis.

Example 2

Exemplary Synthesis

Apparatus:
Same as Example 1

Procedure: Water was charged into the reactor, stirring was initiated along with heating to a target temperature of 100° C. During this phase, itaconic acid, sodium methallylsulfonate, sodium allylsulfonate, and maleic anhydride were added so as to make a 70% w/w solids dispersion with the following monomer mole fractions:

maleic: 45%
itaconic: 50%
methallylsulfonate: 4%
allylsulfonate: 1%

When the reactor temperature reached 100° C., vanadium oxysulfate was added to give a vanadium metal concentration of 25 ppm by weight. After the vanadium salt fully dissolved, hydrogen peroxide (as 50% w/w dispersion) was added continuously over 3 hours, using the feeding tube. The total amount of hydrogen peroxide added was 7.5% of the dispersion weight in the reactor prior to peroxide addition. After the peroxide addition was complete, the reactor was held at 100° C. for two hours, followed by cooling to room temperature.

The resulting polymer dispersion was found to have less than 1% w/w total of residual monomers as determined by chromatographic analysis.

Example 3

Preparation of Tetrapolymer Partial Salts

A tetrapolymer calcium sodium salt dispersion containing 40% by weight polymer solids in water was prepared by the preferred free radical polymerization synthesis of the invention, using an aqueous monomer reaction mixture having 45 mole percent maleic anhydride, 35 mole percent itaconic acid, 15 mole percent methallylsulfonate sodium salt, and 5 mole percent allylsulfonate. The final tetrapolymer dispersion had a pH of slightly below 1.0 and was a partial sodium salt owing to the sodium cation on the sulfonate monomers. At least about 90% of the monomers were polymerized in the reaction.

This sodium partial salt tetrapolymer was used to create 40% solids in water calcium salts. In each instance, apart from the sodium present in the tetrapolymer mixture, appropriate bases or base precursors (e.g., carbonates), or mixtures thereof were added to the aqueous tetrapolymer at room temperature to generate the corresponding salts. Specifically, the following basic reactants were employed with quantities of the tetrapolymer to give the following salts:

Salt A—calcium carbonate and a minor amount of sodium hydroxide, pH 1.5.

Salt B—calcium carbonate and a minor amount of sodium hydroxide, pH 3.5.

Example 4

Exemplary Synthesis

A terpolymer salt dispersion containing 70% by weight polymer solids in water was prepared using a cylindrical reactor capable of being heated and cooled, and equipped with an efficient mechanical stirrer, a condenser, a gas outlet open to the atmosphere, respective ports for charging liquids and solids to the reactor, a thermometer, and a peroxide feeding tube.

Water (300 g) was charged into the reactor with stirring and heating to a target temperature of 95° C. During heating, itaconic acid, sodium methallylsulfonate, and maleic anhydride were added so as to make a 75% w/w solids dispersion with the following monomer mole fractions: maleic anhydride—20%; itaconic acid—60%; methallylsulfonate sodium salt—20%. When the monomers were initially added, they were in suspension in the water. As the temperature rose, the monomers became more fully dissolved before polymerization was initiated, and the maleic anhydride was hydrolyzed to maleic acid. When the reactor temperature reached 95° C., vanadium oxysulfate was added to yield a vanadium metal concentration of 50 ppm by weight of the reactor contents at the time of addition of the vanadium salt. After the vanadium salt fully dissolved, hydrogen peroxide was added as a 50% w/w dispersion in water continuously over two hours. At the time of hydrogen peroxide addition, not all of the monomers were completely dissolved, achieving what is sometimes referred to as "slush polymerization"; the initially undissolved monomers were subsequently dissolved during the course of the reaction. The total amount of hydrogen peroxide added equaled 5% of the dispersion weight in the reactor before addition of the peroxide.

After the peroxide addition was completed, the reaction mixture was held at 95° C. for two hours, and then allowed to cool to room temperature. The resulting polymer dispersion had a pH of slightly below 1.0 and was a partial sodium salt owing to the sodium cation on the sulfonate monomers. The dispersion was found to have a monomer content of less than 2% w/w, calculated as a fraction of the total solids in the reaction mixture, as determined by chromatographic analysis. Accordingly, over 98% w/w of the initially added monomers were converted to polymer.

Further disclosure pertaining to the Class I polymers and uses thereof is set forth in application S/N PCT/US2014/052987, filed Aug. 27, 2014, which is fully incorporated by reference herein.

Class IA Polyanionic Polymers

Class IA polymers contain both carboxylate and sulfonate functional groups, but are not the tetra- and higher order polymers of Class I. For example, terpolymers of maleic, itaconic, and allylsulfonic repeat units, which are per se known in the prior art, will function as the polyanionic polymer component of the compositions of the invention. The Class IA polymers thus are normally homopolymers, copolymers, and terpolymers, advantageously including repeat units individually and independently selected from the group consisting of type B, type C, and type G repeat units, without the need for any additional repeat units. Such polymers can be synthesized in any known fashion, and can also be produced using the previously described Class I polymer synthesis.

Class IA polymers preferably have the same molecular weight ranges and the other specific parameters (e.g., pH and polymer solids loading) previously described in connection with the Class I polymers, and may be converted to partial or complete salts using the same techniques described with reference to the Class I polymers.

Class II Polyanionic Polymers

Broadly speaking, the polyanionic polymers of this class are of the type disclosed in U.S. Pat. No. 8,043,995, which is incorporated by reference herein in its entirety. The polymers include repeat units derived from at least two different monomers individually and respectively taken from the group consisting of what have been denominated for ease of reference as B' and C' monomers; alternately, the polymers may be formed as homopolymers or copolymers from recurring C' monomers. The repeat units may be randomly distributed throughout the polymer chains.

In detail, repeat unit B' is of the general formula

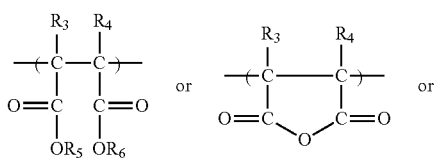

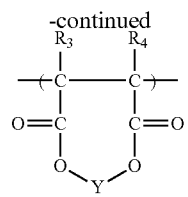

and repeat unit C' is of the general formula

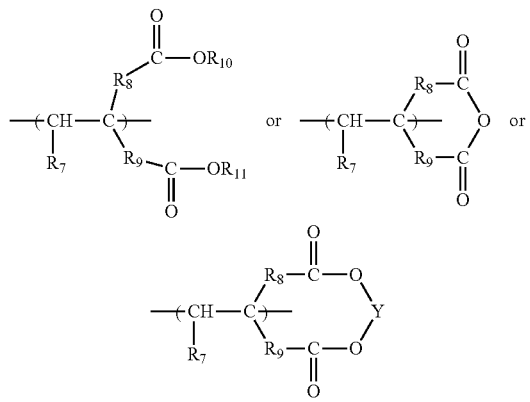

wherein each $R_7$ is individually and respectively selected from the group consisting of H, OH, $C_1$-$C_{30}$ straight, branched chain and cyclic alkyl or aryl groups, $C_1$-$C_{30}$ straight, branched chain and cyclic alkyl or aryl formate ($C_0$), acetate ($C_1$), propionate ($C_2$), butyrate ($C_3$), etc. up to $C_{30}$ based ester groups, R'CO$_2$ groups, OR' groups and COOX groups, wherein R' is selected from the group consisting of $C_1$-$C_{30}$ straight, branched chain and cyclic alkyl or aryl groups and X is selected from the group consisting of H, the alkali metals, NH$_4$ and the $C_1$-$C_4$ alkyl ammonium groups, $R_3$ and $R_4$ are individually and respectively selected from the group consisting of H, $C_1$-$C_{30}$ straight, branched chain and cyclic alkyl or aryl groups, $R_5$, $R_6$, $R_{10}$ and $R_{11}$ are individually and respectively selected from the group consisting of H, the alkali metals, NH$_4$ and the $C_1$-$C_4$ alkyl ammonium groups, Y is selected from the group consisting of Fe, Mn, Mg, Zn, Cu, Ni, Co, Mo, V, W, the alkali metals, the alkaline earth metals, polyatomic cations containing any of the foregoing (e.g., VO$^{+2}$), amines, and mixtures thereof; and $R_8$ and $R_9$ are individually and respectively selected from the group consisting of nothing (i.e., the groups are non-existent), CH$_2$, C$_2$H$_4$, and C$_3$H$_6$.

As can be appreciated, the Class II polymers typically have different types and sequences of repeat units. For example, a Class II polymer comprising B' and C' repeat units may include all three forms of B' repeat units and all three forms of C' repeat units. However, for reasons of cost and ease of synthesis, the most useful Class II polymers are made up of B' and C' repeat units. In the case of the Class II polymers made up principally of B' and C' repeat units, $R_5$, $R_6$, $R_{10}$, and $R_{11}$ are individually and respectively selected from the group consisting of H, the alkali metals, NH$_4$, and the $C_1$-$C_4$ alkyl ammonium groups. This particular Class II polymer is sometimes referred to as a butanedioic methylenesuccinic acid copolymer and can include various salts and derivatives thereof.

The Class II polymers may have a wide range of repeat unit concentrations in the polymer. For example, Class II polymers having varying ratios of B':C' (e.g., 10:90, 60:40, 50:50 and even 0:100) are contemplated and embraced by the present invention. Such polymers would be produced by varying monomer amounts in the reaction mixture from which the final product is eventually produced and the B' and C' type repeat units may be arranged in the polymer backbone in random order or in an alternating pattern.

The Class II polymers may have a wide variety of molecular weights, ranging for example from 500-5,000,000, depending chiefly upon the desired end use. Additionally, n can range from about 1-10,000 and more preferably from about 1-5,000.

Preferred Class II polyanionic polymers are usually synthesized using dicarboxylic acid monomers, as well as precursors and derivatives thereof. For example, polymers containing mono and dicarboxylic acid repeat units with vinyl ester repeat units and vinyl alcohol repeat units are contemplated; however, polymers principally comprised of dicarboxylic acid repeat units are preferred (e.g., at least about 85%, and more preferably at least about 93%, of the repeat units are of this character). Class II polymers may be readily complexed with salt-forming cations using conventional methods and reactants.

Synthesis of the Class II Polyanionic Polymers of the Invention

In general, the Class II polymers are made by free radical polymerization serving to convert selected monomers into the desired polymers with repeat units. Such polymers may be further modified to impart particular structures and/or properties. A variety of techniques can be used for generating free radicals, such as addition of peroxides, hydroperoxides, azo initiators, persulfates, percarbonates, per-acid, charge transfer complexes, irradiation (e.g., UV, electron beam, X-ray, gamma-radiation and other ionizing radiation types), and combinations of these techniques. Of course, an extensive variety of methods and techniques are well known in the art of polymer chemistry for initiating free-radical polymerizations. Those enumerated herein are but some of the more frequently used methods and techniques. Any suitable technique for performing free-radical polymerization is likely to be useful for the purposes of practicing the present invention.

The polymerization reactions are carried out in a compatible solvent system, namely a system which does not unduly interfere with the desired polymerization, using essentially any desired monomer concentrations. A number of suitable aqueous or non-aqueous solvent systems can be employed, such as ketones, alcohols, esters, ethers, aromatic solvents, water and mixtures thereof. Water alone and the lower ($C_1$-$C_4$) ketones and alcohols are especially preferred, and these may be mixed with water if desired. In some instances, the polymerization reactions are carried out with the substantial exclusion of oxygen, and most usually under an inert gas such as nitrogen or argon. There is no particular criticality in the type of equipment used in the synthesis of the polymers, i.e., stirred tank reactors, continuous stirred tank reactors, plug flow reactors, tube reactors and any combination of the foregoing arranged in series may be employed. A wide range of suitable reaction arrangements are well known to the art of polymerization.

In general, the initial polymerization step is carried out at a temperature of from about 0° C. to about 120° C. (more preferably from about 30° C. to about 95° C. for a period of from about 0.25 hours to about 24 hours and even more preferably from about 0.25 hours to about 5 hours). Usually, the reaction is carried out with continuous stirring.

After the polymerization reaction is complete, the Class II polymers may be converted to partial or saturated salts using conventional techniques and reactants.

Preferred Class II Maleic-Itaconic Polyanionic Polymers

The most preferred Class II polymers are composed of maleic and itaconic B' and C' repeat units and have the generalized formula

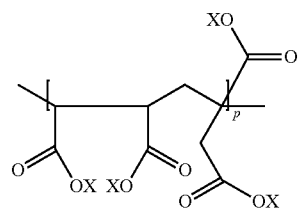

where X is either H or another salt-forming cation, depending upon the level of salt formation.

In a specific example of the synthesis of a maleic-itaconic Class II polymer, acetone (803 g), maleic anhydride (140 g), itaconic acid (185 g) and benzoyl peroxide (11 g) were stirred together under inert gas in a reactor. The reactor provided included a suitably sized cylindrical jacketed glass reactor with mechanical agitator, a contents temperature measurement device in contact with the contents of the reactor, an inert gas inlet, and a removable reflux condenser. This mixture was heated by circulating heated oil in the reactor jacket and stirred vigorously at an internal temperature of about 65-70° C. This reaction was carried out over a period of about 5 hours. At this point, the contents of the reaction vessel were poured into 300 g water with vigorous mixing. This gave a clear solution. The solution was subjected to distillation at reduced pressure to drive off excess solvent and water. After sufficient solvent and water have been removed, the solid product of the reaction precipitates from the concentrated solution, and is recovered. The solids are subsequently dried in vacuo. A schematic representation of this reaction is shown below.

Step 1

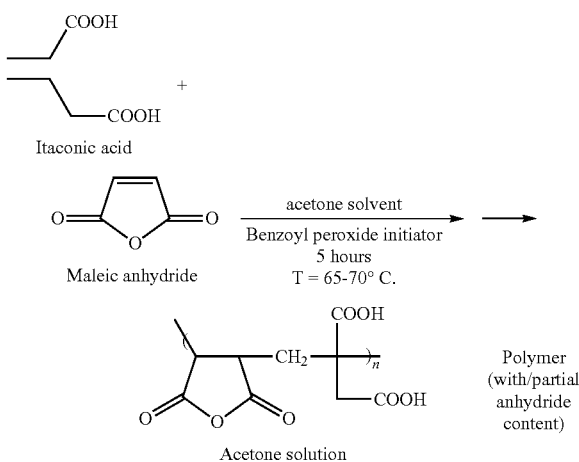

Step2

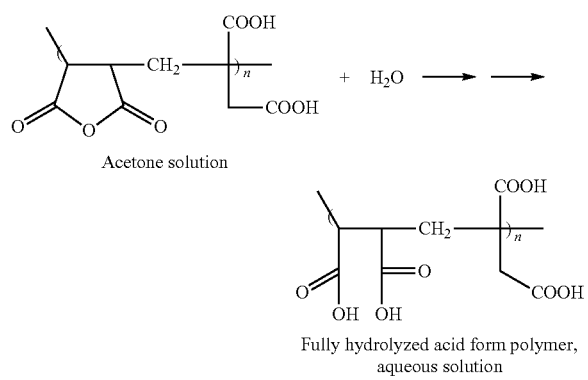

Acetone solution

Fully hydrolyzed acid form polymer, aqueous solution

Once again, the Class II polymers should have the same preferred characteristics as those of the Class I and Class IA polymers set forth above.

High Molecular Weight Components

1. High Molecular Weight Copolymers

When HMW (2)(a) copolymers are used, they should contain dicarboxylic repeat units preferably polymerized with repeat units selected from the group consisting of C2-C12 straight, branched chain, or cyclic alkylenes (e.g., ethylene, propylene, butylene, isobutylene, pentene), C2-C8 alkyl vinyl ethers (e.g., methyl or ethyl vinyl ethers). Preferably, the (2)(a) copolymers should contain at least about 25% by mole fraction of the dicarboxylic and/or anhydride repeat units, and more preferably at least about 40% by mole fraction thereof, where all of the repeat units present in the copolymers make up 100% by mole fraction.

2. Cellulose and Cellulose Derivatives

The (2)(b) HMW components are typically in the form of carboxymethylcellulose (CMC) compounds. Naturally occurring cellulose is highly reactive inasmuch as the hydroxyl groups thereof can be partially or fully reacted with various reagents to form derivatives. As used herein, "derivatives" of cellulose refers to any useful reaction product between cellulose hydroxy groups and another reagent. It is known to cross-link cellulosic derivatives with a polyfunctional carboxylic acid, namely citric acid, in order to generate films. See, Coma et al., *Film Properties from Cross linking of Cellulosic Derivatives with a Polyfunctional Carboxylic Acid*, Carboxylic Polymers, 51 (2003), 265-271.

Although cellulose itself could be used in the context of the invention, cellulose derivatives are more useful. The hydroxyl groups of cellulose can be partially or fully reacted with various reagents to afford derivatives with useful properties; cellulose esters and cellulose ethers are the most common cellulose derivatives.

Generally, suitable cellulose materials should have an average of at least 0.9 carboxylate groups per each cellulose repeat unit, and a viscosity of at least about 200 cps, at 20° C. (more preferably at least about 300 cps, and most preferably at least about 500 cps), measured as 1% w/w solutions in water. Carboxymethyl cellulose products are generally most useful. However, cellulose derivatives potentially useful in the invention, depending upon the form of the derivative, include:

organic esters—e.g., cellulose carboxylates, xanthates, thiocarbonates including cellulose acetate, cellulose triacetate, cellulose propionate, cellulose acetate propionate (CAP), cellulose acetate butyrate (CAB);

inorganic esters—e.g., nitrocellulose (cellulose nitrate), cellulose sulfate, esters of mineral acids other than nitrates;

alkyl cellulose ethers—e.g., methyl cellulose, ethyl cellulose, ethyl methyl cellulose, more generally where the alkyl group(s) are C1-C6 groups;

hydroxy alkyl cellulose esters—e.g., hydroxyethyl cellulose (HEC), hydroxypropyl cellulose (HPC), hydroxyethyl methyl cellulose, hydroxypropyl methyl cellulose (HPMC), ethylhydroxyethyl cellulose, more generally where the alkyl group(s) are C1-C6 groups;

carboxyalkyl cellulose esters—e.g., carboxymethyl cellulose (CMC), methylhydroxy propel cellulose (MHPC), more generally where the alkyl group(s) are C1-C6 groups.

Optional Solvents/Additives

If desired, non-aqueous solvents containing hydroxyl groups may be added to the complete compositions; such optional solvents preferably contain two or more hydroxyl groups, and may be selected from C2-C6 glycols, polyols (e.g., glycerol or pentaerythritol). Optional solvents, when used, can be present at a level up to about 90% w/w, and preferably up to about 50% w/w. Other optional ingredients may be employed such as mineral particles, biostats, compounds to control freezing points, opacifiers, colorants, markers, fillers, pigments, and dyes. Such other optional ingredients may be used at a level up to about 30% w/w.

The Complete Compositions

The compositions of the invention may be prepared by forming an aqueous dispersion containing a mixture of one or more high molecular weight components and a polyanionic polymer, and adding to this dispersion sufficient cations so that the dispersion pH reaches a desired level, generally from about 1-13, more preferably from about 1-12, and most preferably from about 1-7. Compositions for treatment of certain fertilizers, e.g., urea and gypsum, and for inclusion of micronutrients, should have lower acidic pHs, up to about 2, and more preferably up to about 1. Another preferred method comprises separately preparing the polyanionic and high molecular weight components as appropriate full or partial salts, and subsequently mixing the two. The complete compositions should have a viscosity of at least about 100 cps, preferably at least about 200 cps, and most preferably at least about 500 cps, under the aforementioned viscosity testing conditions. The method of preparation is not critical, i.e., ease of preparation and cost are the principal considerations.

The overall compositions, when in the form of aqueous dispersions or solutions, should include from about 10-90% w/w water, and most preferably from about 15-75% w/w water. The high molecular weight component fraction can vary widely, from about 1-40% w/w, and most preferably from about 2-20% w/w. The polyanionic polymer fraction can also vary widely, from about 1-80% w/w, more preferably from about 5-60% w/w. Preferably, the complete compositions are true solutions, e.g., at least about 20% by weight thereof is fully soluble in an adequate amount of pure water at 20° C.

The following are exemplary compositions in accordance with the invention in the form of aqueous dispersions:

1. maleic-itaconic copolymer, sodium salt 30% w/w, maleic-isobutylene copolymer, sodium salt 15% w/w, with the balance being water, and the pH being 7.5;

2. maleic-itaconic copolymer, potassium salt 30% w/w, maleic-isobutylene copolymer, potassium salt 15% w/w, with the balance being water, and the pH being 8.0;
3. T5 polymer, sodium salt 30% w/w, maleic-isobutylene copolymer, sodium salt 15% w/w, with the balance being water, and the pH being 7.5;
4. T5 polymer, potassium salt 30% w/w, maleic-isobutylene copolymer, potassium salt 15% w/w, with the balance being water, and the pH being 8.0;
5. maleic-itaconic copolymer, sodium salt 30% w/w, maleic-ethylene copolymer, sodium salt 15% w/w, with the balance being water, and the pH being 7.5;
6. maleic-itaconic copolymer, potassium salt 30% w/w, maleic-ethylene copolymer, potassium salt 15% w/w, with the balance being water, and the pH being 8.0;
7. T5 polymer, sodium salt 30% w/w, maleic-ethylene copolymer, sodium salt 15% w/w, with the balance being water, and the pH being 7.5;
8. T5 polymer, potassium salt 30% w/w, maleic-ethylene copolymer, potassium salt 15% w/w, with the balance being water, and the pH being 8.0;
9. maleic-itaconic copolymer, sodium salt 20% w/w, maleic-isobutylene copolymer, sodium salt 15% w/w, glycerol 10% w/w, with the balance being water, and the pH being 7.5;
10. maleic-itaconic copolymer, sodium salt 20% w/w, maleic-isobutylene copolymer, sodium salt 10% w/w, 1,2-propanediol 10% w/w, with the balance being water, and the pH being 7.5;
11. maleic-itaconic copolymer, sodium salt 30% w/w, maleic-methyl vinyl ether copolymer, sodium salt 15% w/w, with the balance being water, and the pH being 7.5;
12. maleic-itaconic copolymer, potassium salt 30% w/w, maleic-methyl vinyl ether copolymer, potassium salt 15% w/w, with the balance being water, and the pH being 8.0;
13. T5 polymer, sodium salt 30% w/w, maleic-methyl vinyl ether copolymer, sodium salt 15% w/w, with the balance being water, and the pH being 7.5;
14. T5 polymer, potassium salt 30% w/w, maleic-methyl vinyl ether copolymer, potassium salt 15% w/w, with the balance being water, and the pH being 8.0;
15. maleic-itaconic copolymer, sodium salt, 36% w/w, maleic-isobutylene copolymer, sodium salt, 5% w/w, glycerol, 5% w/w, with the balance being water, and the pH being 7.5;
16. maleic-itaconic copolymer, sodium salt, 32% w/w, maleic-isobutylene copolymer, sodium salt, 9% w/w, glycerol, 5% w/w, with the balance being water, and the pH being 7.5;
17. maleic-itaconic copolymer, sodium salt, 32% w/w, maleic-ethylene copolymer, sodium salt, 9% w/w, glycerol, 5% w/w, with the balance being water, and the pH being 7.5;
18. maleic-itaconic copolymer, sodium salt, 36% w/w, maleic-ethylene copolymer, sodium salt, 5% w/w, glycerol, 5% w/w, with the balance being water, and the pH being 7.5.

The compositions may also be dried, in which event the foregoing percentages of non-aqueous ingredients are increased proportionately to take into account the absence of water.

The compositions of the invention have important functional advantages, stemming from the water-absorptive capacities, as explained in more detail below. Broadly speaking, the compositions can be used wherever such water-absorptive characteristics are desired. The anionic polymeric fraction of the compositions may be in acid form or as partial or complete salts.

Uses of the Compositions

1. Fertilizer Uses

As explained above, the compositions of the invention may be mixed with fertilizers in order to enhance the functionality thereof. The useful fertilizers are set forth below, and the fertilizer/polymeric composition composites are formed by mixing the compositions with the desired fertilizer(s) at a level of from about 0.001-100 lbs of the compositions per acre of soil or growing plants, more preferably from about 0.005-50 lbs per acre, and still more preferably from about 0.01-2 lbs per acre. The composites may be applied in the solid form or as liquids.

Where sufficient quantities of the compositions as aqueous dispersions are applied to the surfaces of solid fertilizers, the compositions, when "wet" and prior to complete drying thereof, attract and agglomerate already present fines in the solid fertilizer. Moreover, upon complete drying and creation of a hardened coating, the fertilizer/composition composites are significantly more resistant to the creation of fines during subsequent transport, handling, and application of the coated fertilizers. These dual benefits substantially reduce fines, which is a decided economic benefit to sellers and users of the products.

In one use embodiment, composition 1 above was heated to a temperature of about 80-90° C. and sprayed onto commercial granular ammonium phosphate fertilizer containing significant fines at a level of 2.1 liters per 1,000 kg of fertilizer, for fines control. In another such embodiment, the composition 2 above was heated to a temperature of about 80-90° C. and sprayed onto granular potassium chloride fertilizer at a rate of 1 liter per 1,000 kg fertilizer.

While the compositions hereof may be used at elevated temperatures, such is not mandatory. In one example, the composition 17 above was sprayed at a temperature of 30° C. onto granular ammonium phosphate at a level of 2.1 liters per 1,000 kg of fertilizer. Similarly, the composition 18 above was sprayed at 30° C. at a rate of 2.1 liters per 1,000 kg of fertilizer.

2. Suitable Solid Fertilizer Products

A wide variety of fertilizer products may be coated or mixed with the compositions of the invention, including but not limited to phosphate-based fertilizers such as monoammonium phosphate (MAP), diammonium phosphate (DAP), any one of a number of well known N—P—K fertilizer products, and/or fertilizers containing nitrogen materials such as ammonium nitrate, ammonium sulfate, urea, ammonium phosphates, sodium nitrate, calcium nitrate, potassium nitrate, nitrate of soda, urea formaldehyde, metal (e.g. zinc, iron) ammonium phosphates; phosphorous materials such as calcium phosphates (normal phosphate and super phosphate), ammonium phosphate, ammoniated super phosphate, phosphoric acid, superphosphoric acid, basic slag, rock phosphate, colloidal phosphate, bone phosphate; potassium materials such as potassium chloride, potassium sulfate, potassium nitrate, potassium phosphate, potassium hydroxide, potassium carbonate; calcium materials, such as calcium sulfate, calcium carbonate, calcium nitrate; magnesium materials, such as magnesium carbonate, magnesium oxide, magnesium sulfate, magnesium hydroxide; sulfur materials such as ammonium sulfate, sulfates of other fertilizers discussed herein, ammonium thiosulfate, elemental sulfur (either alone or included with or coated on other fertilizers); micronutrients such as Zn, Mn, Cu, Fe, and other micronutrients; oxides, sulfates, chlorides, and chelates of such micronutrients (e.g., zinc oxide, zinc sulfate and zinc chloride); such chelates sequestered onto other carriers such as EDTA; boron materials such as boric acid, sodium borate or calcium borate; and molybdenum materials such as sodium molybdate. These solid fertilizers may exist as prills, granules, powders, and other forms.

3. Uses with Sulfur-Bearing Compounds

One particularly important agricultural utility of the novel compositions of the invention is the ability of the compositions to enhance the effectiveness of sulfur-bearing compounds such as gypsum, one or more members of the Kieserite Group, potassium magnesium sulfate, elemental sulfur, and mixtures thereof. The compositions may be applied as surface coatings as solid fertilizers, or may be added to solutionized liquid fertilizers as a liquid; this combined liquid material may then be sprayed on soils prior to planting. Moreover, the compositions liberate soluble calcium and soluble sulfur-containing species from gypsum and other minerals. Calcium sulfate exists in a wide range of forms, crystal structures, hydration levels, and particle morphologies, but the calcium sulfate content thereof has been difficult to exploit for plant nutrition purposes, owing to the poor solubility of the calcium and sulfur-containing species therein.

It has been found that the addition of comparatively small levels of the compositions of the invention applied to solid calcium sulfate or calcium sulfate-containing materials serves to increase the liberation of calcium and soluble sulfur species from calcium sulfate or similar materials. Generally, the compositions are used at a level of from about 0.01-10% w/w, more preferably from about 0.05-2% w/w, where the total weight of the composition/calcium sulfate or calcium sulfate-containing products is taken as 100% by weight.

These effects are further enhanced by the inclusion of alpha-hydroxy carboxylic acid compounds with the compositions of the invention, which may be used singly or in mixtures of 2 or more acids. The most useful alpha-hydroxy acids are saturated and essentially free of double bonds and carbon ring structures, including both aliphatic and aromatic ring structures (i.e., no more than about 5 mole percent of double bonds or ring structures). Such alpha-hydroxy acids possess at least one carboxylic acid functional group and have at least one hydroxyl group on the carbon atom adjacent to the carboxylate group. Especially preferred acids of this character include lactic acid (D, L, or racemic mixtures are useful), glycolic acid, citric acid, tartaric acid, tartronic acid, glyceric acid, and dihydroxypropanedioic acid. The alpha-hydroxy acids may have more than one carboxylic acid functional group per molecule, more than one alphahydroxyl group, or any combination thereof.

The preferred alpha-hydroxy acid-supplemented formulations generally include from about 10-45% w/w, more preferably from about 15-35% w/w, of the compositions of the invention; from about 3-60% w/w, more preferably from about 10-40% w/w, of alpha-hydroxy carboxylic acid(s); and the balance being an inert solvent, preferably water. The foregoing ranges are based upon the total weight of the formulations taken as 100% by weight.

The alpha-hydroxy acid-supplemented formulations may be further improved with respect to coating uniformity and general performance by the addition of polyvinyl alcohols (PVA's) thereto. While essentially all PVA's are useful, preferred PVA's are of relatively low average molecular weight, such that a 4% w/w solution of the PVA's in water at 20° C. ranges between about 1-1000 cps. Very small amounts of PVA's may be used in a range of from about 0.1% w/w-10% w/w of the total formulation, and more preferably from about 0.05% w/w-2% w/w. It is also possible to use more than one molecular weight of PVA, but the PVA combinations advantageously are within the above viscosity ranges. Still further, preferred PVA's have high levels of hydrolysis, where at least 97 mole percent, and preferably at least about 98 mole percent, of the functional groups are hydrolyzed.

In normal use, the alpha-hydroxy acid-supplemented formulations, with or without the incorporation of PVA's, is applied to the surface of solid calcium sulfate and/or calcium sulfate materials, and allowed to dry thereon. Thus, in the final product, the dried residue of the initial polymer/alpha-hydroxy formulations are present on the surface of the dried calcium sulfate and/or calcium sulfate materials. Alternately, these compositions may be added to solutionized fertilizers. The alpha-hydroxy acid-supplemented formulations are normally used at a level of from about 0.01-10% by weight, more preferably from about 0.05-2%, based upon the total weight of the finished composite product taken as 100% by weight.

4. Specific Uses with Potassium-Containing Granular Fertilizers

Another significant agricultural utility of the compositions of the invention involves use with potassium-containing granular fertilizers in order to decrease fertilizer losses. That is, the compositions may be applied directly to granular potassium fertilizer, and especially potassium chloride-based fertilizers, at a level of from about 0.001-10% by weight, more preferably from about 0.004-2% by weight, based upon the total weight of the composition/potassium fertilizer composite taken as 100% by weight. In order to form suitable coatings on these fertilizers without generation of significant amounts of hydrochloric acid, it is generally preferred that the polymers be neutralized with a suitable cation to a pH of above about 6, more preferably above 7.

Additionally, use of compositions in accordance with the present invention increases the availability of phosphorus and other common fertilizer ingredients and decreases nitrogen volatilization, thereby rendering ambient levels of such plant nutrient available for uptake by growing plants. In such cases, the compositions can be applied as a coating to fertilizer products prior to their introduction into the soil. In turn, plants grown in soil containing such polymers exhibit enhanced growth characteristics.

5. Uses as Seed Coatings

Another alternative use of compositions in accordance with the present invention includes using the compositions as seed coatings. In such cases, the compositions comprise at least about 0.001-10% by weight of the coated seed, more preferably from about 0.004-2% by weight of the coated seed. The compositions hereof provide an enhanced opportunity for seed germination, subsequent plant growth, and an increase in plant nutrient availability.

The polymer fractions of the compositions may have a relatively high metals content, and particularly micronutrient metals, such as Zn, Mn, B, Fe, Mo, and Cu, to provide sufficient micronutrients for optimum seed growth. Moreover, the compositions are desirably solutions relatively free of suspended or settled solids for reasons of homogeneity and cosmetic appearance, and should have a pH in the range of from about 4-8. In practice, the compositions are applied to the surfaces of seeds in any convenient fashion, and allowed to dry thereon, so that the finished seeds have the dried residue of the original liquid composition on the surfaces thereof.

6. Uses of the Polymers with Zinc Salt/Urea Compositions

Compositions comprising urea and zinc salts are known, particularly for the purpose of overcoming zinc deficiencies. See, e.g., U.S. Pat. Nos. 3,981,713 and 8,101,548. It has been found that the novel compositions of the invention can be used with such zinc salt/urea mixtures in order to minimize volatilization by inhibiting the action of ureases. In such contexts, the composition should have a pH of 6 or less, more preferably from about 2-4. Advantageously, the compositions are applied to granular urea, using the techniques and quantities described previously with respect to fertilizers generally. In preferred practice, the composition/zinc aqueous mixtures should be applied to the urea and allowed to dry so that the dried residue thereof remains on the fertilizer surfaces.

7. Uses in Reducing Atmospheric Ammonia

The novel compositions hereof may be used to treat manure pits or field-applied manure, or livestock or poultry confinement facilities, in order to reduce and mitigate the effects of gaseous ammonia. Generally, such pits are simply open ponds or pools, and the containment facilities have a lower manure collection zone, upright walls forming an enclosure, and a roof substantially covering the zone. This utility involves applying a treatment material directly to the manure within the pit or field, or in the collection zone, in amounts effective to lower the concentration of gaseous ammonia. Such material comprises an aqueous mixture of a composition in accordance with the present invention, and particularly when an amine, alkali metal or alkaline earth (e.g., calcium or ammonium) partial or saturated salt of the anionic polymer is employed. The treating material including the composition hereof should be applied at a level of from about 0.005-3 gallons per ton of manure, and more preferably from about 0.01-2.5 gallons per ton. The composition is preferably acidic having a pH of from about 1-5, and more preferably from about 2-4. When used in the context of a confinement facility, the treating material is operable to reduce the amount of gaseous ammonia within the confinement zone by a level of at least 50% within 24 hours after application of the materials.

U.S. Patent Publication 2014/0041431 is incorporated by reference herein in its entirety. This publication describes techniques for reducing atmospheric ammonia through use of Class II polymers. These same techniques without alteration can be used with the complete compositions of the present invention.

It is sometimes useful to employ a plurality of different polyanionic polymers in the manure-treating compositions. For example, useful compositions may include from about 40-80% (more preferably 55-75%) by weight of a partial calcium salt of a polymer of the invention, and from about 20-60% (more preferably 25-45%) by weight of a partial ammonium salt of the same or a different polymer in accordance with the invention.

8. Uses as Animal Feed and/or Water Amendments

U.S. patent application Ser. No. 14/049,887, filed Oct. 9, 2013, discloses the use of Class I and/or Class II polymers as animal feed or water amendments serving to lower ammonia concentrations in the animal's excrement. That application is incorporated by reference herein in its entirety. The methods, animal feeds, and animal waters disclosed therein can be directly duplicated, without any alternations, in the context of the present invention where the compositions are used in lieu of the polymers disclosed therein. Thus, the types of polymers and salts used, the range of solids, and the amounts of water remain the same in the present invention. Likewise, the same specific methods of use may be employed in the context of the present invention.

9. Pesticide Adjuvants

The compositions of the invention can be used to enhance the effectiveness of a wide spectrum of pesticides. As used herein, "pesticide" refers to any agent with pesticidal activity (e.g., herbicides, insecticides, fungicides, and nematocides) and is preferably selected from the group consisting of insecticides, herbicides, and mixtures thereof. The well known pyrethroid and organophosphate pesticides are suitable for use in the invention, as well as glyphosate herbicides.

In some cases, a composition in accordance with the invention is blended with the pesticide to form a mixture which then can be applied to soil, in foliar applications, onto hard surfaces, as aerosols, as additives to liquid or solid compositions (e.g., manure), or in any other context where pesticidal activity is desired. Alternately, the pesticide and composition may be simultaneously or sequentially (typically within 24 hours of each other) applied to soil. Where mixed products are employed, they are typically in the form of aqueous dispersions, generally having water, pesticide, and composition fractions. Other minor ingredients may also be used in the products such as surfactants and pH adjustment agents, or any of the other aforementioned adjuvants or additives known in the art. Composites comprising a composition of the invention with glyphosate and micronutrients are also effective, with minimal use of the micronutrients.

The amounts of the compositions of the invention in the pesticide composites can vary over wide limits, and the principal consideration is one of polymer cost. Generally, the compositions of the invention should be present at a level of from about 0.05-10% by weight (more preferably from about 0.1-4% by weight, and most preferably from about 0.2-2% by weight) based upon the total weight of the pesticide composite taken as 100% by weight.

The pesticides used in the composites of the invention are broadly selected from insecticides and herbicides. In the context of insecticides, synthetic pyrethroids and organophosphates are particularly preferred. For example, permethrin ($C_{21}H_{20}C_{1}2O_3$, (3-phenoxyphenyl) methyl 3-(2,2-dichloroethenyl)-2,2-dimethyl-cyclopropane-1-carboxylate, CAS#52645-53-1) and bifenthrin ($C_{23}H_{22}C_1F_3O_2$, (2-methyl-3-phenylphenyl) methyl (1S,3S)-3-[(Z)-2-chloro-3,3,3-trifluoroprop-1-enyl]-2,2-dimethylcyclopropane-1-carboxylate, CAS#82657-04-3) are suitable pyrethroids. A typical organophosphate pesticide useful in the invention is malathion ($C_{10}H_{19}O_6PS_2$, 2-(dimethoxyphosphinothioylthio) butanedioic acid diethyl ester, CAS#121-75-5).

More generally, the following insecticides are useful in the invention:

antibiotic insecticides: allosamidin, thuringiensin
    macrocyclic lactone insecticides
        avermectin insecticides: abamectin, doramectin, emamectin, eprinomectin, ivermectin, selamectin
        milbemycin insecticides: lepimectin, ilbemectin, milbemycin oxime, moxidectin
    spinosyn insecticides: spinetoram, spinosad
arsenical insecticides: calcium arsenate, copper acetoarsenite, copper arsenate, lead arsenate, potassium arsenite, sodium arsenite
botanical insecticides: anabasine, azadirachtin, d-limonene, nicotine, pyrethrins (cinerins (cinerin I, cinerin II), jasmolin I, jasmolin II, pyrethrin I, pyrethrin II), quassia, rotenone, ryania, sabadilla carbamate insecticides: bendiocarb, carbaryl
  benzofuranyl methylcarbamate insecticides: benfuracarb, carbofuran, carbosulfan, decarbofuran, furathiocarb
  dimethylcarbamate insecticides: dimetan, dimetilan, hyquincarb, pirimicarb
  oxime carbamate insecticides: alanycarb, aldicarb, aldoxycarb, butocarboxim, butoxycarboxim, methomyl, nitrilacarb, oxamyl, tazimcarb, thiocarboxime, thiodicarb, thiofanox
  phenyl methylcarbamate insecticides: allyxycarb, aminocarb, bufencarb, butacarb, carbanolate, cloethocarb, dicresyl, dioxacarb, EMPC, ethiofencarb, fenethacarb, fenobucarb, isoprocarb, methiocarb, metolcarb, mexacarbate, promacyl, promecarb, propoxur, trimethacarb, XMC, xylylcarb
desiccant insecticides: boric acid, diatomaceous earth, silica gel
diamide insecticides: chlorantraniliprole, cyantraniliprole, flubendiamide
dinitrophenol insecticides: dinex, dinoprop, dinosam, DNOC
fluorine insecticides: barium hexafluorosilicate, cryolite, sodium fluoride, sodium hexafluorosilicate, sulfluramid
formamidine insecticides: amitraz, chlordimeform, formetanate, formparanate
fumigant insecticides: acrylonitrile, carbon disulfide, carbon tetrachloride, chloroform, chloropicrin, para-dichlorobenzene, 1,2-dichloropropane, ethyl formate, ethylene dibromide, ethylene dichloride, ethylene oxide, hydrogen cyanide, iodomethane, methyl bromide, methylchloroform, methylene chloride, naphthalene, phosphine, sulfuryl fluoride, tetrachloroethane
inorganic insecticides: borax, boric acid, calcium polysulfide, copper oleate, diatomaceous earth, mercurous chloride, potassium thiocyanate, silica gel, sodium thiocyanate, see also arsenical insecticides, see also fluorine insecticides
insect growth regulators
  chitin synthesis inhibitors: bistrifluron, buprofezin, chlorfluazuron, cyromazine, diflubenzuron, flucycloxuron, flufenoxuron, hexaflumuron, lufenuron, novaluron, noviflumuron, penfluron, teflubenzuron, triflumuron
  juvenile hormone mimics: epofenonane, fenoxycarb, hydroprene, kinoprene, methoprene, pyriproxyfen, triprene
  juvenile hormones: juvenile hormone I, juvenile hormone II, juvenile hormone III
  moulting hormone agonists: chromafenozide, halofenozide, methoxyfenozide, tebufenozide
  moulting hormones: a-ecdysone, ecdysterone
  moulting inhibitors: diofenolan
  precocenes: precocene I, precocene II, precocene III
  unclassified insect growth regulators: dicyclanil
nereistoxin analogue insecticides: bensultap, cartap, thiocyclam, thiosultap
nicotinoid insecticides: flonicamid
  nitroguanidine insecticides: clothianidin, dinotefuran, imidacloprid, thiamethoxam
  nitromethylene insecticides: nitenpyram, nithiazine
  pyridylmethylamine insecticides: acetamiprid, imidacloprid, nitenpyram, thiacloprid
organochlorine insecticides: bromo-DDT, camphechlor, DDT (pp'-DDT), ethyl-DDD, HCH (gamma-HCH, lindane), methoxychlor, pentachlorophenol, TDE
  cyclodiene insecticides: aldrin, bromocyclen, chlorbicyclen, chlordane, chlordecone, dieldrin, dilor, endosulfan (alpha-endosulfan), endrin, HEOD, heptachlor, HHDN, isobenzan, isodrin, kelevan, mirex
organophosphorus insecticides
  organophosphate insecticides: bromfenvinfos, chlorfenvinphos, crotoxyphos, dichlorvos, dicrotophos, dimethylvinphos, fospirate, heptenophos, methocrotophos, mevinphos, monocrotophos, naled, naftalofos, phosphamidon, propaphos, TEPP, tetrachlorvinphos
  organothiophosphate insecticides: dioxabenzofos, fosmethilan, phenthoate
    aliphatic organothiophosphate insecticides: acethion, amiton, cadusafos, chlorethoxyfos, chlormephos, demephion (demephion-O, demephion-S), demeton (demeton-O, demeton-S), demeton-methyl (demeton-O-methyl, demeton-S-methyl), demeton-S-methylsulphon, disulfoton, ethion, ethoprophos, IPSP, isothioate, malathion, methacrifos, oxydemeton-methyl, oxydeprofos, oxydisulfoton, phorate, sulfotep, terbufos, thiometon
    aliphatic amide organothiophosphate insecticides: amidithion, cyanthoate, dimethoate, ethoatemethyl, formothion, mecarbam, omethoate, prothoate, sophamide, vamidothion
    oxime organothiophosphate insecticides: chlorphoxim, phoxim, phoxim-methyl
  heterocyclic organothiophosphate insecticides: azamethiphos, coumaphos, coumithoate, dioxathion, endothion, menazon, morphothion, phosalone, pyraclofos, pyridaphenthion, quinothion
    benzothiopyran organothiophosphate insecticides: dithicrofos, thicrofos
    benzotriazine organothiophosphate insecticides: azinphos-ethyl, azinphos-methyl
    isoindole organothiophosphate insecticides: dialifos, phosmet
    isoxazole organothiophosphate insecticides: isoxathion, zolaprofos
    pyrazolopyrimidine organothiophosphate insecticides: chlorprazophos, pyrazophos
    pyridine organothiophosphate insecticides: chlorpyrifos, chlorpyrifos-methyl
    pyrimidine organothiophosphate insecticides: butathiofos, diazinon, etrimfos, lirimfos, pirimiphosethyl, pirimiphos-methyl, primidophos, pyrimitate, tebupirimfos
    quinoxaline organothiophosphate insecticides: quinalphos, quinalphos-methyl
    thiadiazole organothiophosphate insecticides: athidathion, lythidathion, methidathion, prothidathion
    triazole organothiophosphate insecticides: isazofos, triazophos
  phenyl organothiophosphate insecticides: azothoate, bromophos, bromophos-ethyl, carbophenothion, chlorthiophos, cyanophos, cythioate, dicapthon, dichlofenthion, etaphos, famphur, fenchlorphos, fenitrothion, fensulfothion, fenthion, fenthion-ethyl, heterophos, jodfenphos, mesulfenfos, parathion, parathion-methyl, phenkapton, phosnichlor, profenofos, prothiofos, sulprofos, temephos, trichlormetaphos-3, trifenofos
phosphonate insecticides: butonate, trichlorfon
phosphonothioate insecticides: mecarphon
  phenyl ethylphosphonothioate insecticides: fonofos, trichloronat
  phenyl phenylphosphonothioate insecticides: cyanofenphos, EPN, leptophos phosphoramidate insecticides: crufomate, fenamiphos, fosthietan, mephosfolan, phosfolan, pirimetaphos phosphoramidothioate insecticides: acephate, isocarbophos, isofenphos, isofenphos-methyl, methamidophos, propetamphos phosphorodiamide insecticides: dimefox, mazidox, mipafox, schradan oxadiazine insecticides: indoxacarb oxadiazolone insecticides: metoxadiazone phthalimide insecticides: dialifos, phosmet, tetramethrin pyrazole insecticides: chlorantraniliprole, cyantraniliprole, dimetilan, tebufenpyrad, tolfenpyrad phenylpyrazole insecticides: acetoprole, ethiprole, fipronil, pyraclofos, pyrafluprole, pyriprole, vaniliprole pyrethroid insecticides pyrethroid ester insecticides: acrinathrin, allethrin (bioallethrin), barthrin, bifenthrin, bioethanomethrin, cyclethrin, cycloprothrin, cyfluthrin (beta-cyfluthrin), cyhalothrin, (gamma-cyhalothrin, lambda-cyhalothrin), cypermethrin (alpha-cypermethrin, beta-cypermethrin, theta-cypermethrin, zeta-cypermethrin), cyphenothrin, deltamethrin, dimefluthrin, dimethrin, empenthrin, fenfluthrin, fenpirithrin, fenpropathrin, fenvalerate (esfenvalerate), flucythrinate, fluvalinate (tau-fluvalinate), furethrin, imiprothrin, metofluthrin, permethrin (biopermethrin, transpermethrin), phenothrin, prallethrin, profluthrin, pyresmethrin, resmethrin (bioresmethrin, cismethrin), tefluthrin, terallethrin, tetramethrin, tralomethrin, transfluthrin pyrethroid ether insecticides: etofenprox, flufenprox, halfenprox, protrifenbute, silafluofen pyrimidinamine insecticides: flufenerim, pyrimidifen pyrrole insecticides: chlorfenapyr tetramic acid insecticides: spirotetramat tetronic acid insecticides: spiromesifen thiazole insecticides: clothianidin, thiamethoxam thiazolidine insecticides: tazimcarb, thiacloprid thiourea insecticides: diafenthiuron urea insecticides: flucofuron, sulcofuron, see also chitin synthesis inhibitors unclassified insecticides: closantel, copper naphthenate, crotamiton, EXD, fenazaflor, fenoxacrim, hydramethylnon, isoprothiolane, malonoben, metaflumizone, nifluridide, plifenate, pyridaben, pyridalyl, pyrifluquinazon, rafoxanide, sulfoxaflor, triarathene, triazamate.

The foregoing insecticides, and links for a further identification and description of the insecticides, can be found at http://www.alanwood.net/pesticides/class_insecticides.html, which is incorporated herein in its entirety.

A particularly preferred herbicide is glyphosate (C3H8NO5P, [(phosphonomethyl) amino] acetic acid, CAS#1071-83-6). Other herbicides which can be used in the invention include:

amide herbicides: allidochlor, amicarbazone, beflubutamid, benzadox, benzipram, bromobutide, cafenstrole, CDEA, cyprazole, dimethenamid (dimethenamid-P), diphenamid, epronaz, etnipromid, fentrazamide, flucarbazone, flupoxam, fomesafen, halosafen, isocarbamid, isoxaben, napropamide, naptalam, pethoxamid, propyzamide, quinonamid, saflufenacil, tebutam anilide herbicides: chloranocryl, cisanilide, clomeprop, cypromid, diflufenican, etobenzanid, fenasulam, flufenacet, flufenican, ipfencarbazone, mefenacet, mefluidide, metamifop, monalide, naproanilide, pentanochlor, picolinafen, propanil, sulfentrazone arylalanine herbicides: benzoylprop, flamprop (flamprop-M), chloroacetanilide herbicides: acetochlor, alachlor, butachlor, butenachlor, delachlor, diethatyl, dimethachlor, metazachlor, metolachlor (S-metolachlor), pretilachlor, propachlor, propisochlor, prynachlor, terbuchlor, thenylchlor, xylachlor sulfonanilide herbicides: benzofluor, cloransulam, diclosulam, florasulam, flumetsulam, metosulam, perfluidone, pyrimisulfan, profluazol sulfonamide herbicides: asulam, carbasulam, fenasulam, oryzalin, penoxsulam, pyroxsulam, see also sulfonylurea herbicides thioamide herbicides: bencarbazone, chlorthiamid antibiotic herbicides: bilanafos aromatic acid herbicides:
benzoic acid herbicides: chloramben, dicamba, 2,3,6-TBA, tricamba pyrimidinyloxybenzoic acid herbicides: bispyribac, pyriminobac pyrimidinylthiobenzoic acid herbicides: pyrithiobac phthalic acid herbicides: chlorthal picolinic acid herbicides: aminopyralid, clopyralid, picloram quinolinecarboxylic acid herbicides: quinclorac, quinmerac arsenical herbicides: cacodylic acid, CMA, DSMA, hexaflurate, MAA, MAMA, MSMA, potassium arsenite, sodium arsenite benzoylcyclohexanedione herbicides: mesotrione, sulcotrione, tefuryltrione, tembotrione benzofuranyl alkylsulfonate herbicides: benfuresate, ethofumesate benzothiazole herbicides: benazolin, benzthiazuron, fenthiaprop, mefenacet, methabenzthiazuron carbamate herbicides: asulam, carboxazole, chlorprocarb, dichlormate, fenasulam, karbutilate, terbucarb carbanilate herbicides: barban, BCPC, carbasulam, carbetamide, CEPC, chlorbufam, chlorpropham, CPPC, desmedipham, phenisopham, phenmedipham, phenmedipham-ethyl, propham, swep cyclohexene oxime herbicides: alloxydim, butroxydim, clethodim, cloproxydim, cycloxydim, profoxydim, sethoxydim, tepraloxydim, tralkoxydim cyclopropylisoxazole herbicides: isoxachlortole, isoxaflutole dicarboximide herbicides: cinidon-ethyl, flumezin, flumiclorac, flumioxazin, flumipropyn, see also uracil herbicides dinitroaniline herbicides: benfluralin, butralin, dinitramine, ethalfluralin, fluchloralin, isopropalin, methalpropalin, nitralin, oryzalin, pendimethalin, prodiamine, profluralin, trifluralin dinitrophenol herbicides: dinofenate, dinoprop, dinosam, dinoseb, dinoterb, DNOC, etinofen, medinoterb diphenyl ether herbicides: ethoxyfen
nitrophenyl ether herbicides: acifluorfen, aclonifen, bifenox, chlomethoxyfen, chlornitrofen, etnipromid, fluorodifen, fluoroglycofen, fluoronitrofen, fomesafen, furyloxyfen, halosafen, lactofen, nitrofen, nitrofluorfen, oxyfluorfen dithiocarbamate herbicides: dazomet, metam halogenated aliphatic herbicides: alorac, chloropon, dalapon, flupropanate, hexachloroacetone, iodomethane, methyl bromide, monochloroacetic acid, SMA, TCA imidazolinone herbicides: imazamethabenz, imazamox, imazapic, imazapyr, imazaquin, imazethapyr inorganic herbicides: ammonium sulfamate, borax, calcium chlorate, copper sulfate, ferrous sulfate, potassium azide, potassium cyanate, sodium azide, sodium chlorate, sulfuric acid nitrile herbicides: bromobonil, bromoxynil, chloroxynil, dichlobenil, iodobonil, ioxynil, pyraclonil organophosphorus herbicides: amiprofos-methyl, anilofos, bensulide, bilanafos, butamifos, 2,4-DEP, DMPA, EBEP, fosamine, glufosinate (glufosinate-P), glyphosate, piperophos oxadiazolone herbicides: dimefuron, methazole, oxadiargyl, oxadiazon oxazole herbicides: carboxazole, fenoxasulfone, isouron, isoxaben, isoxachlortole, isoxaflutole, monisouron, pyroxasulfone, topramezone phenoxy herbicides: bromofenoxim, clomeprop, 2,4-DEB, 2,4-DEP, difenopenten, disul, erbon, etnipromid, fenteracol, trifopsime phenoxyacetic herbicides: 4-CPA, 2,4-D, 3,4-DA, MCPA, MCPA-thioethyl, 2,4,5-T phenoxybutyric herbicides: 4-CPB, 2,4-DB, 3,4-DB, MCPB, 2,4,5-TB phenoxypropionic herbicides: cloprop, 4-CPP, dichlorprop (dichlorprop-P), 3,4-DP, fenoprop, mecoprop, (mecoprop-P)

aryloxyphenoxypropionic herbicides: chlorazifop, clodinafop, clofop, cyhalofop, diclofop, fenoxaprop, (fenoxaprop-P), fenthiaprop, fluazifop, (fluazifop-P), haloxyfop, (haloxyfop-P), isoxapyrifop, metamifop, propaquizafop, quizalofop, (quizalofop-P), trifop phenylenediamine herbicides: dinitramine, prodiamine pyrazole herbicides: azimsulfuron, difenzoquat, halosulfuron, metazachlor, metazosulfuron, pyrazosulfuron, pyroxasulfone benzoylpyrazole herbicides: benzofenap, pyrasulfotole, pyrazolynate, pyrazoxyfen, topramezone phenylpyrazole herbicides: fluazolate, nipyraclofen, pinoxaden, pyraflufen pyridazine herbicides: credazine, pyridafol, pyridate pyridazinone herbicides: brompyrazon, chloridazon, dimidazon, flufenpyr, metflurazon, norflurazon, oxapyrazon, pydanon pyridine herbicides: aminopyralid, cliodinate, clopyralid, diflufenican, dithiopyr, flufenican, fluroxypyr, haloxydine, picloram, picolinafen, pyriclor, pyroxsulam, thiazopyr, triclopyr pyrimidinediamine herbicides: iprymidam, tioclorim quaternary ammonium herbicides: cyperquat, diethamquat, difenzoquat, diquat, morfamquat, paraquat thiocarbamate herbicides: butylate, cycloate, di-allate, EPTC, esprocarb, ethiolate, isopolinate, methiobencarb, molinate, orbencarb, pebulate, prosulfocarb, pyributicarb, sulfallate, thiobencarb, tiocarbazil, tri-allate, vernolate thiocarbonate herbicides: dimexano, EXD, proxan thiourea herbicides: methiuron triazine herbicides: dipropetryn, indaziflam, triaziflam, trihydroxytriazine chlorotriazine herbicides: atrazine, chlorazine, cyanazine, cyprazine, eglinazine, ipazine, mesoprazine, procyazine, proglinazine, propazine, sebuthylazine, simazine, terbuthylazine, trietazine methoxytriazine herbicides: atraton, methometon, prometon, secbumeton, simeton, terbumeton methylthiotriazine herbicides: ametryn, aziprotryne, cyanatryn, desmetryn, dimethametryn, methoprotryne, prometryn, simetryn, terbutryn triazinone herbicides: ametridione, amibuzin, hexazinone, isomethiozin, metamitron, metribuzin triazole herbicides: amitrole, cafenstrole, epronaz, flupoxam triazolone herbicides: amicarbazone, bencarbazone, carfentrazone, flucarbazone, ipfencarbazone, propoxycarbazone, sulfentrazone, thiencarbazone triazolopyrimidine herbicides: cloransulam, diclosulam, florasulam, flumetsulam, metosulam, penoxsulam, pyroxsulam uracil herbicides: benzfendizone, bromacil, butafenacil, flupropacil, isocil, lenacil, saflufenacil, terbacil urea herbicides: benzthiazuron, cumyluron, cycluron, dichloralurea, diflufenzopyr, isonoruron, isouron, methabenzthiazuron, monisouron, noruron phenylurea herbicides: anisuron, buturon, chlorbromuron, chloreturon, chlorotoluron, chloroxuron, daimuron, difenoxuron, dimefuron, diuron, fenuron, fluometuron, fluothiuron, isoproturon, linuron, methiuron, methyldymron, metobenzuron, metobromuron, metoxuron, monolinuron, monuron, neburon, parafluron, phenobenzuron, siduron, tetrafluron, thidiazuron sulfonylurea herbicides:

pyrimidinylsulfonylurea herbicides: amidosulfuron, azimsulfuron, bensulfuron, chlorimuron, cyclosulfamuron, ethoxysulfuron, flazasulfuron, flucetosulfuron, flupyrsulfuron, foramsulfuron, halosulfuron, imazosulfuron, mesosulfuron, metazosulfuron, nicosulfuron, orthosulfamuron, oxasulfuron, primisulfuron, propyrisulfuron, pyrazosulfuron, rimsulfuron, sulfometuron, sulfosulfuron, trifloxysulfuron triazinylsulfonylurea herbicides: chlorsulfuron, cinosulfuron, ethametsulfuron, iodosulfuron, metsulfuron, prosulfuron, thifensulfuron, triasulfuron, tribenuron, triflusulfuron, tritosulfuron thiadiazolylurea herbicides: buthiuron, ethidimuron, tebuthiuron, thiazafluron, thidiazuron unclassified herbicides: acrolein, allyl alcohol, aminocyclopyrachlor, azafenidin, bentazone, benzobicyclon, bicyclopyrone, buthidazole, calcium cyanamide, cambendichlor, chlorfenac, chlorfenprop, chlorflurazole, chlorflurenol, cinmethylin, clomazone, CPMF, cresol, cyanamide, ortho-dichlorobenzene, dimepiperate, endothal, fluoromidine, fluridone, flurochloridone, flurtamone, fluthiacet, indanofan, methyl isothiocyanate, OCH, oxaziclomefone, pentachlorophenol, pentoxazone, phenylmercury acetate, prosulfalin, pyribenzoxim, pyriftalid, quinoclamine, rhodethanil, sulglycapin, thidiazimin, tridiphane, trimeturon, tripropindan, traduce.

The foregoing herbicides, and links for a further identification and description of the herbicides, can be found at http://www.alanwood.net/pesticides/class_herbicides.html, which is incorporated herein in its entirety.

In many instances, pesticides having an amphoteric or positive surface charge are preferred. Such surface charge characteristics may be inherent in the pesticide employed, or may arise by applying an appropriate cationic or amphoteric surfactant onto the surfaces of pesticide particles. Generally, the surfactants are used at a level of from about 0.01-10% by weight (more preferably from about 0.1-3% by weight) based upon the total weight of the pesticide fraction in the overall composition taken as 100% by weight.

Suitable cationic surfactants include: dieicosyldimethyl ammonium chloride; didocosyldimethyl ammonium chloride; dioctadecyidimethyl ammonium chloride; dioctadecyldimethyl ammonium methosulphate; ditetradecyldimethyl ammonium chloride and naturally occurring mixtures of above fatty groups, e.g., di(hydrogenated tallow)dimethyl ammonium chloride; di(hydrogenated tallow)dimethyl ammonium metho-sulphate; ditallow dimethyl ammonium chloride; and dioleyidimethyl ammonium chloride.

These cationic surfactants also include imidazolinium compounds, for example, 1-methyl-1-(tallowylamido-) ethyl-2-tallowyl4,5-dihydroimidaz-olinium methosulphate and 1-methyl-1-(palmitoylamido)ethyl-2-octadecyl 4,5-dihydro-imidazolinium methosulphate. Other useful imidazolinium materials are 2-heptadecyl-1-methyl-1 (2-stearoylamido)-ethyl-imidazoliniu-m methosulphate and 2-lauryl-1hydroxyethyl-1-oleyl-imidazolinium chloride.

Further examples of suitable cationic surfactants include: dialkyl(C12-C22)dimethylammonium chloride; alkyl(coconut)dimethylbenzylammonium chloride; octadecylamine acetate salt; tetradecylamine acetate salt; tallow alkylpropylenediamine acetate salt; octadecyltrimethylammonium chloride; alkyl(tallow)trimethylammonium chloride; dodecyltrimethylammonium chlorid; alkyl(coconut)trimethylammonium chloride; hexadecyltrimethylammonium chloride; biphenyltrimethylammonium chloride, alkyl(tallow) imidazoline quaternary salt; tetradecylmethylbenzylammonium chloride; octadecyidimethylbenzylammonium chloride; dioleyidimethylammonium chloride; polyoxyethylene dodecylmonomethylammonium chloride; polyoxyethylene alkyl(C12-C22) benzylammonium chloride; polyoxyethylene laurylmonomethyl ammonium chloride; 1-hydroxyethyl-2-alkyl(tallow)-imidazoline quaternary salt; and a silicone cationic surfactant having a siloxane group as a hydrophobic group, a fluorine-containing cationic surfactant having a fluoroalkyl group as a hydrophobic group.

Amphoteric (Zwitterionic) surfactants have a positive, negative, or both charges on the hydrophilic part of the molecule in acidic or alkaline media. Any suitable amphoteric surfactant may be used. For example, aminoprorionates may be employed where the alkyl chain of the aminoproprionate is preferably between about C.4 and about C.12 and may be branched or linear. The aminoproprionate may also be a sodium alkyl aminoproprionate. One representative commercially available product is sold under the trade name MIRATAINE JC-HA.

Other suitable amphoteric surfactants include, diproprionates such as Mirataine H2C-HA, sultaines such as Mirataine ASC, betaines such as Mirataine BET-O-30, amine oxides such as Barlox 12i and amphoteric imidazoline derivatives in the acetate form, Miranol JEM Conc, diproprionate form, Miranol C2M-SF Conc.), and sulfonates such as Miranol JS Conc.

Other examples of amphoteric surfactants include amino acid, betaine, sultaine, sulfobetaines, carboxylates and sulfonates of fatty acids, phosphobetaines, imidazolinium derivatives, soybean phospholipids, yolk lecithin, the alkali metal, alkaline earth metal, ammonium or substituted ammonium salts of alkyl amphocarboxy glycinates and alkyl amphocarboxypropionates, alkyl amphodipropionates, alkyl amphodiacetates, alkyl amphoglycinates and alkyl amphopropionates wherein alkyl represents an alkyl group having 6 to 20 carbon atoms, alkyliminopropionates, alkyl iminodipropionates and alkyl amphopropylsulfonates having between 12 and 18 carbon atoms, alkylbetaines and amidopropylbetaines and alkylsultaines and alkylamidopropylhydroxy sultaines wherein alkyl represents an alkyl group having 6 to 20 carbon atoms.

10. Nitrification/Urease Inhibition

The compositions of the invention may also serve as inhibitors for the nitrification processes within soil, and to also inhibit urease activity therein. In this fashion, increased crop yields are realized owing to the fact that naturally occurring and fertilizer-supplied nitrogen sources are more efficiently utilized by plants. Most conveniently, the compositions of the invention are used with fluid (e.g., gaseous or liquid) or solid fertilizers containing ammoniacal nitrogen.

As used herein, "ammoniacal nitrogen" is abroad term embracing fertilizer compositions containing ammoniacal nitrogen ($NH_4$) as well as fertilizer compositions and other compounds which are precursors of ammoniacal nitrogen or that cause ammoniacal nitrogen to be generated when the fertilizers or compounds undergo various reactions such as hydrolysis. To give but one example, the compositions of the invention may be applied to or mixed with urea or other nitrogen-containing fertilizers which have no ammoniacal nitrogen therein as such. Nonetheless, such fertilizers will undergo reactions in the soil to generate ammoniacal nitrogen in situ. Thus, in this example urea or other precursor nitrogen-containing fertilizers would be deemed to contain ammoniacal nitrogen.

When the compositions of the invention are used in the form of aqueous dispersions in intimate contact with or dispersed in ammoniacal nitrogen fertilizers, the mixture is typically applied to soil adjacent growing plants or pre-applied to soils subject to nitrification. Aqueous compositions are typically used with liquid fertilizers at relatively low levels up to about 2% by volume (e.g., 0.01-2% by volume) based upon the total volume of the liquid fertilizer material taken as 100% by volume. In such uses, it is also preferred that the pH levels should be up to about 3, more preferably up to about 2, and most preferably up to about 1. Moreover, such aqueous dispersions advantageously contain from about 10-85% by weight solids, more preferably from about 40-65% by weight solids, and most preferably about 50% by weight solids.

In preparing the liquid fertilizer composites of the invention, the ammoniacal nitrogen-containing fertilizer material (s) are suspended in water and the aqueous polymer mixture (s) are added thereto with mixing. No particular mixing regime or temperature conditions are required. Surprisingly, it has been found that these liquid fertilizer materials are quite stable and resist settling out or precipitation of solids over extended storage periods of at least about two weeks.

In the case of solid ammoniacal fertilizers, the compositions are directly applied to the fertilizer, typically at a level of from about 0.01-10% by weight, more preferably from about 0.05-2% by weight, based upon the total weight of the polymer/fertilizer product taken as 100% by weight.

We claim:

1. A polymeric composition comprising:
   at least one polyanionic polymer component comprising a polymer having maleic, itaconic, and sulfonate repeat units; and
   at least one high-molecular-weight component, wherein said at least one high molecular weight component is a copolymer different than said polyanionic polymer, said copolymer comprising dicarboxylate repeat units and repeat units selected from the group consisting of straight or branched chain C2-C12 alkylenes, straight or branched chain C1-C8 alkyl vinyl ethers and mixtures thereof, wherein said copolymer contains at least about 25% by mole fraction of said dicarboxylate repeat units,
   wherein said polyanionic polymer component is present at a level of from about 1-80% w/w, and said high-molecular-weight component is present at a level of from about 1-40% w/w, said composition being soluble in water with a water content of about 15-75% w/w.

2. The composition of claim 1, said composition having a solids content of from about 25-85% w/w.

3. The composition of claim 1, said polyanionic polymer component being present at a level of from about 5-60% w/w, and said high-molecular-weight component being present at a level of from about 2-20% w/w.

4. The composition of claim 1, said composition having a hydrocarbon content of no more than about 5% w/w.

5. The composition of claim 1, said high-molecular-weight component having a viscosity of at least about 100 cps as a 2.0% w/w water solution.

6. The composition of claim 5, said viscosity being from about 200-2000 cps.

7. The composition of claim 1, said composition being solubilized in water and having additional ingredients selected from the group consisting of non-aqueous solvents containing hydroxyl groups, mineral particles, biostats, opacifiers, colorants, markers, fillers, pigments, dyes, and compounds to control the freezing point of the composition, and mixtures thereof.

8. The composition of claim 1, wherein the composition has a viscosity of at least about 200 cps. at 20° C., measured as a 1.0% w/w water solution.

9. The composition of claim 1, wherein the at least one polyanionic polymer component comprises a polymer having maleic, itaconic, and two sulfonate repeat units.

10. The composition of claim 1, wherein the at least one polyanionic polymer component comprises a tetrapolymer having maleic, itaconic, methallylsulfonic and allylsulfonic repeat units.

11. The composition of claim 1, wherein the at least one polyanionic polymer component comprises a tetrapolymer having 35-50% maleic; 20-55% itaconic; 1-25% methallylsulfonic acid, and 1-20% allylsulfonic acid repeat units, wherein the total amount of all repeat units in the polymer is taken as 100 mole percent.

12. A polymeric composition comprising:
    at least one polyanionic polymer component comprising a polymer having maleic, itaconic and sulfonate repeat units; and
    at least one high-molecular-weight component, wherein said at least one high-molecular-weight component is a cellulose or cellulose derivative having at least an average of about 0.9 carboxylate groups per cellulose repeat unit, wherein the cellulose or cellulose derivative has a viscosity of at least about 200 cps. at 20° C., measured as a 1.0% w/w water solution,
    wherein said polyanionic polymer component is present at a level of from about 1 80% w/w, and said high-molecular-weight component is present at a level of from about 1 40% w/w,
    said composition having a viscosity of less than about 1,000 cps at 20° C., and
    said composition being soluble in water with a water content of about 15-75% w/w.

* * * * *